US006650718B1

(12) United States Patent
Fujimura et al.

(10) Patent No.: US 6,650,718 B1
(45) Date of Patent: Nov. 18, 2003

(54) TIMING REPRODUCER AND DEMODULATOR COMPRISING THIS

(75) Inventors: Akinori Fujimura, Tokyo (JP); Seiji Okubo, Tokyo (JP); Toshiharu Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/926,091

(22) PCT Filed: Feb. 14, 2000

(86) PCT No.: PCT/JP00/00769

§ 371 (c)(1),
(2), (4) Date: Aug. 28, 2001

(87) PCT Pub. No.: WO01/48999

PCT Pub. Date: Jul. 5, 2001

(30) Foreign Application Priority Data

Dec. 28, 1999 (JP) ............................. 11-374278

(51) Int. Cl.7 ............................. H04L 7/00; H04L 25/00
(52) U.S. Cl. ........................................ 375/355; 375/371
(58) Field of Search ................................ 375/371, 355, 375/373; 327/144, 156, 162, 163, 147

(56) References Cited

U.S. PATENT DOCUMENTS 6,208,701 B1 * 3/2001 Hiramatsu et al. .......... 375/354

FOREIGN PATENT DOCUMENTS

| JP | 54-12251 | 1/1979 |
| JP | 6-141048 | 5/1994 |
| JP | 6-252963 | 9/1994 |
| JP | 7-212430 | 8/1995 |
| JP | 7-235956 | 9/1995 |
| JP | 8-46658 | 2/1996 |
| JP | 11-103326 | 4/1999 |

OTHER PUBLICATIONS

T. Nagura, et al., The Institute of Electronics, Information and Communication Engineers, pp. 7–12, "Carrier–Clock Simultaneous Recovery Scheme", Sep. 1994 (with English Abstract).
A. Fujimura et al., The Report of the Institute of Electronics, Information and Communication Engineers, vol. J81–B–11, No. 6, pp. 665–668, "Timing Recovery Scheme Using Received Signal Phase Information for QPSK Modulation", Jun. 1998.

* cited by examiner

Primary Examiner—Tesfaldet Bocure
(74) Attorney, Agent, or Firm—Oblon, Spivak, McClelland, Maier & Neustadt, PC

(57) ABSTRACT

A timing recovery device and demodulator. An adding device adds together an in-phase component and a quadrature component of a base band signal. A subtracting device subtracts the in-phase component and the quadrature component of the base band signal from each other. Then, the correlation between the added signal and a ½ symbol frequency component generated at the receiver side and the correlation between the subtracted value and the ½ symbol frequency component are calculated. A vector selector compares the added value correlation signal and the subtracted value correlation signal, and selects the larger one of the correlation signals. A timing phase difference calculator then calculates a timing phase difference, using the vector angle indicated by the selected correlation signal.

24 Claims, 29 Drawing Sheets

TIMING REPRODUCER AND DEMODULATOR COMPRISING THIS

This application is the national phase under 35 U.S.C. §371 of PCT International Application No. PCT/JP00/00769 which has an International filing date of Feb. 14, 2000, which designated the United States of America and was not published in English.

TECHNICAL FIELD

The present invention relates to a timing recovery device and a demodulator and, more particularly, to a timing recovery device and a demodulator suitable for use in a broadband digital radio communication system in which a burst signal begins with a preamble.

BACKGROUND ART

For a timing recovery device of a demodulator for a conventional broadband digital radio communication system which employs a preamble signal, there are described two schemes, for example, in literature "Carrier-Clock Simultaneous Recovery Scheme" by Nagura, Matsumoto, Kubota and Kato, The Institute of Electronics, Information and Communication Engineers, Technical Report of IEICE, RCS94-60, pp. 7–12, September 1994.

The one scheme is to estimate a timing phase from a preamble signal now widely used for OQPSK modulation. This preamble signal is a signal (of a "1101" pattern, for instance) which effects an alternate transition between two adjacent Nyquist points in a complex plane upon each occurrence of a symbol. A patent for this scheme is "Burst Signal Demodulation Circuit" (Pat. Appln. Laid-Open No. 35956/95, Inventors: Matsumoto and Kato).

The other scheme is to estimate a timing phase from a preamble signal widely used for QPSK modulation. This preamble signal is a "$0\pi$" modulation signal (of a "1001" pattern, for instance) which effects an alternate transition between two origin-symmetric Nyquist points in a complex plane upon each occurrence of a symbol. A patent for this scheme is "Burst Signal Demodulation Circuit" (Pat. Appln. Laid-Open No. 46658/96, Inventors: Nagura, Matsumoto and Kato).

According to these schemes, both of which utilize the fact that either preamble signal has a frequency component ½ that of a symbol frequency (fs), the receiver side calculates the correlation between the preamble signal and a ½ symbol frequency component $\exp[-j\pi(fs)t]$ output from a VCO, and estimates the timing phase from a vector angle indicated by the correlation value.

In either scheme the data sampling rate is only 2 [sample/symbol]; since this sampling rate is ½ the minimum value of the sampling rate (=4 [sample/symbol] needed in a conventional scheme which estimates the timing phase from the correlation between a nonlinearly processed signal (for example, an envelope) and a symbol frequency component $\exp[-j2\pi(fs)t]$ as described in, for example, literature "Signal Detecting System and Burst Demodulating Equipment" (Pat. Appln. Laid-Open No. 141048/94, Inventor: Yoshida), the reduction of the sampling rate permits reduction of the power consumption of the receiver. The above-mentioned two schemes (Pat. Appln. Laid-Open No. 235956/95 and Pat. Appln. Laid-Open No. 46658/96) will be described below in detail.

A description will be given first of a timing recovery scheme (pat. Appln. Laid-Open 235956/95) that uses the preamble ("1101" pattern) signal which effects an alternate transition between two adjacent Nyquist points in a complex plane upon each occurrence of a symbol.

FIG. 17 is a block diagram depicting the above-mentioned demodulator containing a timing recovery device. In FIG. 17, reference numeral 100 denotes an antenna, 200 frequency converting means, 301 and 302 A/D converters, 400 a timing recovery device, and 500 data decision means; and in the timing recovery device 400, reference numeral 401 denotes one-symbol delay means, 402 conjugate complex multiplying means, 403 timing phase difference calculating means, and 404 a VCO.

Next, the operation of the conventional demodulator will be described. The antenna 100 receives an RF band preamble signal, and the frequency converting means 200 frequency-converts the RF band preamble signal to a base band preamble signal.

FIG. 18 is a signal space diagram of the base band preamble signal ("1101" pattern. In FIG. 18, reference character $\theta c$ denotes the carrier phase of the received signal; the preamble signal effects an alternate transition between Nyquist points "A" and "B" in the figure upon each occurrence of a symbol. The vector angle of the Nyquist point "A" is ($\theta c-45$) (deg), and the vector angle of the Nyquist point "B" is ($\theta c+45$) [deg]; the difference between the vector angles of the Nyquist points "A" and "B" is 90 [deg].

The A/D converter 301 samples an in-phase component of the base band preamble signal at a time $t=\tau+iT/2$ (where I=1,2,3, ..., $\tau$ is a timing error ($-T/2 \leq \tau < T/2$) and T is a symbol period), and outputs a sampled preamble data sequence $Ip_i$ (where i=1,2,3, ... ). Similarly, the A/D converter 302 samples a quadrature component of the base band preamble signal at a time $t=\tau+iT/2$, and outputs a samples preamble data sequence $Qp_i$ (where 1=1,2,3, ... ).

Therefore, it is apparent that the sampling rate is 2[sample/symbol]. The sampling is performed by the leading edge of a recovered sample clock output from the timing recovery device 400 of the following stage, and during a timing phase estimating operation no phase control of the recovered sample clock is effected.

The timing recovery device 400 uses the preamble data sequence $Ip_i$ (where i=1,2,3, ... ) and the preamble data sequence $Qp_i$ (where i=1,2,3, ... ) to calculate the timing error $\tau$, and exercises phase control of the recovered sample clock and a recovered symbol clock to cancel the timing error $\tau$.

The recovered symbol clock mentioned herein is a clock of the symbol period obtained by frequency dividing the recovered sample clock down to ½.

The data decision means 500 latches, by the recovered symbol clock, data at the Nyquist points from significant random data sequences $Id_i$ and $Qd_i$ (where i=1,2,3, ... ) following the preamble after cancellation of the timing error $\tau$ by the timing recovery device 400. And the data decision means uses the latched Nyquist point data to decide data, and outputs demodulated data.

Next, the operation of the timing recovery device 400 will be described. The one-symbol delay means 401 delays the preamble data sequence $Ip_i$ (where i=1,2,3, ... ) and the preamble data $Qp_i$ (where i=1,2,3, ... ) by a one-symbol time interval, and the conjugate complex multiplying means 402 performs conjugate complex multiplications of the preamble data sequences ($Ip_i$, $Qp_i$) and one-symbol old preamble data sequences ($Ip_{i-2}$, $Qp_{i-2}$) by the following equations.

$$Id_i = (Ip_i \times Ip_{i-2}) + (Q_{pi} \times Qp_{i-2}) \tag{1a}$$

$$Qd_i = (Qp_i \times Ip_{i-2}) + (I_{pi} \times PQi_{-2}) \tag{1b}$$

By this processing, the preamble signal is differential-detected. With such processing, it is possible to obtain a preamble signal which effects an alternate transition between points "C" and "D" upon each occurrence of a symbol independently of the carrier phase θc as depicted in FIG. 19. The phase θx(t) indicated by this preamble signal has a ½ symbol frequency component since it makes a phase transition from +90 [deg] to −90 [deg] and a phase transition from −90 [deg] to +90 [deg] alternately with one symbol period as depicted in FIG. 20.

Then, the timing phase difference calculating means 403 calculates the correlation between the phase θx(t) and the ½ symbol frequency component exp[−jπ(fs)t] output from the VCO. Concretely, letting the phases of the signals (ID$_i$, QD$_i$) be represented by θx$_i$, the timing phase difference calculating means performs the following multiplications $$MI_i = \theta X_i \times \cos \pi i/2 \quad (2a)$$

$$MQ_i = \theta X_i \times \sin \pi i/2 \quad (2b)$$

The timing phase difference calculating means averages the multiplied results (MI$_i$, MQ$_i$), and outputs a correlation value (ΣMI, ΣMQ). Incidentally, since in the multiplications of Equations (2a) and (2b) cos πi/2=1,0,−1,0, . . . and sin πi/2=0,1,0,−1, . . . , the above-said correlation values (ΣMI, ΣMQ) can easily be obtained. For example, in the case of averaging the multiplied values over four symbols, the correlation value (ΣMI, ΣMQ) can be obtained by the following equations.

$$\Sigma MI = (\theta X_i - \theta X_{i+4} + \theta X_{i+4} - \theta X_{i+6} + \theta X_{i+8} - \theta X_{i+10} + \theta X_{i+12} - \theta X_{i+14})/8 \quad (3a)$$

$$\Sigma MQ = (\theta X_{i+1} - \theta X_{i+3} + \theta X_{i+5} - \theta X_{i+76} + \theta X_{i+9} - \theta X_{i+11} + \theta X_{i+13} - \theta X_{i+15})/8 \quad (3b)$$

The vector angle that this correlation value indicates $$Q_T = \tan^{-1}(\Sigma MQ/\Sigma MI)$$

is a timing phase difference when normalized with two symbol periods (2T), and hence the timing phase difference θs [deg] when normalized with the symbol period (T) is obtained by the following equation.

$$\theta s = 2\theta_T \mod 360 \quad (4)$$

The relationship between the timing phase difference θs and the timing error τ is as follows:
In the case of θs>180 [deg], $$\tau = (\theta s - 360)T/360 \quad (5a)$$

In the case of θ ≦ 180 [deg]

$$\tau = (\theta s)T/360 \quad (5b)$$

For example, in the case where the phase signal θX(t) is sampled at the timing shown in FIG. 20 to obtain a data sequence {θX$_i$, θX$_{i+1}$, θX$_{i+2}$, θX$_{i+3}$, . . . }, such a correlation value (ΣMI, ΣMQ) and a timing phase difference θ$_T$ as shown in FIG. 21 are obtained.

Based on the timing error τ obtained by the above calculation, the timing phase difference calculating means 403 supplies the VCO 404 of the following stage with a control signal that cancels the timing errorτ. The VCO 404 responds to the control signal from the timing phase difference calculating means to control the phases of the recovered sample clock and the recovered symbol clock, reducing the timing errors down to "0".

Next, a description will be given of the timing recovery scheme (Pat. Appln. Laid-Open No. 46658/96) which uses the preamble ("0π" modulation signal of a"1001" pattern, for instance) signal which makes an alternate transition between two origin-symmetric Nyquist points in a complex plane upon each occurrence of a symbol.

In FIG. 22 wherein the parts corresponding to those in FIG. 17 are identified by the same reference numerals, there is depicted demodulating equipment containing the above-mentioned timing recovery device. In FIG. 22, reference numerals 400a denotes a timing recovery device, 403a timing phase difference calculating means, 405a I-channel correlation calculating means, 405b Q-channel correlation calculating means, and 406 vector combining/selecting means.

FIG. 23 is a block diagram of the vector combining/selecting means 406, in which reference numeral 407a denotes first vector combining means, 407b second vector combining means, 407c third vector combining means, 407d fourth vector combining means, 408 maximum absolute value detecting means, and 409 selecting means.

In FIG. 24 wherein the parts corresponding to those in FIG. 23 are identified by the same reference numerals, there is shown another block diagram of the vector combining/selecting means 406, in which reference numerals 410a and 410b denote adding means, 411a first selecting means, 411b second selecting means, 411c third selecting means, and 411d fourth selecting means.

Next, the operation of the demodulator will be described. As is the case with the configuration of the afore-described FIG. 17 prior art example, the antenna 100 receives the RF band preamble signal, and the frequency converting means 200 frequency converts the RF band preamble signal to the base band preamble signal.

In FIG. 25 there is depicted a signal space diagram of the base band preamble signal (of the "1001" pattern). In FIG. 25, reference character θc denotes the carrier phase of the received signal, and the preamble signal performs an alternate transition between the Nyquist points "A" and "B" through the origin for each symbol.

The vector angle of the Nyquist point "A" is θc [deg], the vector angle of the Nyquist point "B" is (θc+180) [deg], and the difference between the vector angles of the Nyquist points "A" and "B" is 180 [deg].

As in the prior art example of FIG. 17, the A/D converter 301 samples the in-phase component of the base band preamble signal at time t=τ+iT/2 (where I=1,2,3, . . . , τ is a timing error (−T/2≦τ<T/2), and T is the symbol period), and outputs the sampled preamble data sequence Ip$_i$ (where i=1,2,3, . . . ).

Similarly, the A/D converter 302 samples the quadrature component of the base band preamble signal at time t=τ+iT, and outputs the sampled preamble data sequence Qp$_i$ (where i=1,2,3, . . . ). The timing recovery device 400a does not effect phase control of the recovered sample clock during the timing phase estimating operation.

The timing recovery device 400a, as in the prior art example of FIG. 17, uses the preamble data sequence Ip$_i$ (where i=1,2,3, . . . ) and the preamble data sequence Qp$_i$ (where i=1,2,3, . . . ) to calculate the timing error τ, and exercises phase control of the recovered sample clock and the recovered symbol clock to cancel the timing error τ. The recovered symbol clock is a clock of the symbol period obtained by frequency dividing the recovered sample clock down to ½.

The data decision means 500 latches, by the recovered symbol clock as in the prior art example of FIG. 17, data at the Nyquist points from the significant random data sequences $Id_i$ and $Qd_i$ (where i=1,2,3, . . . ) following the preamble after cancellation of the timing error τ by the timing recovery device 400. And the data decision means uses the latched Nyquist point data to decide data, and outputs demodulated data.

Next, the operation of the timing recovery device 400*a* will be described. In the case of receiving the preamble signal which performs an alternate transition between the origin-symmetric two Nyquist points for each symbol as depicted in FIG. 25, the prior art example of FIG. 17 cannot be used for the reasons given below. When the preamble signal is differential-detected, the phase signal θX(t) (of the output from the conjugate complex multiplying means) after the differential detection is always about 180 [deg], and does not provide the frequency component ½ the symbol frequency, and consequently the correlation between this phase signal and the ½ symbol frequency component exp[–jπ(fs)t] goes to "0".

Hence, the prior art example of FIG. 22 calculates the correlation between each of the in-phase component I(t) and quadrature component Q(t) of the preamble signal of FIG. 25 and the ½ symbol frequency component exp[–jπ(fs)t]. Concretely, the I-channel correlation calculating means 405*a* performs the following multiplications of an over-sampled preamble data sequence $Ip_i$ (where i=1,2,3, . . . )

$$Ic_i = Ip_i \times \cos \pi i/2 \quad (6a)$$

$$Is_i = Ip_i \times \sin \pi i/2 \quad (6b)$$

The I-channel correlation calculating means averages the multiplication results ($Ic_i$, $Is_i$) to obtain a correlation value (CI, SI). The Q-channel collation calculating means 405*b* performs the following multiplications of an oversampled preamble data sequence $Qp_i$ (where i=1,2,3, . . . )

$$Qc_i = Qp_i \times \cos \pi i/2 \quad (7a)$$

$$Qs_i = Qp_i \times \sin \pi i/2 \quad (7b)$$

The Q-channel correlation calculating means averages the multiplication results ($Qc_i$, $Qs_i$) to obtain the correlation value (CQ, SQ).

Incidentally, since in the multiplications of Equations (6a), (6b), (7a) and (7b) cos πi/2=1, 0, –1, 0, . . . , and sin πi/2=0, 1, 0, –1, . . . , the above correlation values (CI, SI) and (CQ, CI) can easily be obtained. For instance, in the case of the averaging the multiplied results over four symbols, the correlation value (CI, SI) can be obtained by the following equations:

$$CI = (Ip_i - Ip_{i+2} + Ip_{i+4} - Ip_{i+6} + Ip_{i+8} - Ip_{i+10} + Ip_{i+12} - Ip_{i+14})/8 \quad (8a)$$

$$SI = (Ip_{i+1} - Ip_{i+3} + Ip_{i+5} - Ip_{i+7} + Ip_{i+9} - Ip_{i+11} + Ip_{i+13} - Ip_{i+15})/8 \quad (8b)$$

The correlation value (CQ, SQ) can be obtained by the following equations:

$$CQ = (Qp_i - Qp_{i+2} + Qp_{i+4} - Qp_{i+6} + Qp_{i+8} - Qp_{i+10} + Qp_{i+12} - Qp_{i+14})/8 \quad (9a)$$

$$SQ = (Qp_{i+1} - Qp_{i+3} + Qp_{i+5} - Qp_{i+7} + Qp_{i+9} - Qp_{i+11} + Qp_{i+13} - Qp_{i+15})/8 \quad (9b)$$

The vector angles that the correlation values (CI, CQ) and (SI, SQ) represent both indicate timing phase errors as in the prior art example of FIG. 17, but according to the carrier phase θc, the angles of the correlation vectors may sometimes face in the same or opposite directions or either one of them may disappear.

For example, when a preamble signal whose carrier phase θc is in the range of (90<θc<180) or (270<θc<360) as shown in FIG. 25 is sampled at the timing shown in FIGS. 26 and 27 to obtain a data sequence $\{Ip_i, Ip_{i+1}, IP_{i+2}, Ip_{i+3}, \ldots\}$ and a data sequence $\{Qp_i, Qp_{i+1}, Qp_{i+2}, Qp_{i+3}, \ldots\}$, such correlation values (CI, SI) and (CQ, SQ) as depicted in FIG. 28 are obtained, and the angles of the correlation vectors face in opposite directions.

On the other hand, when a preamble signal whose phase θc is in the range of (0<θc<90) or (180<θc<270) as shown in FIG. 29 is sampled at the timing shown in FIGS. 30 and 31 to obtain a data sequence $\{Ip_i, Ip_{i+1}, Ip_{i+2}, Ip_{i+3}, \ldots\}$ and a data sequence $\{Qp_i, Qp_{i+1}, Qp_{i+2}, Qp_{i+3}, \ldots\}$, such correlation values (CI, SI) and (CQ, SQ) as depicted in FIG. 32 are obtained, and the angles of the correlation vectors face in the same direction. Further, it is also evident that each vector length varies with the carrier phase θc; when θc={0, 180}, the vector of the correlation value disappears, and when θc={90, –90}, the vector of the correlation value (CQ, SQ).

In view of the above, to exclude the influence of the carrier phase θc, the vector combining/selecting means 406 combines the correlation values (CI, CQ) and (SI, SQ) into the four states described later on, and selects the combined vector of the highest SN ratio, and the timing phase difference calculating means 403*a* calculates the timing phase from the combined vector selected by the vector combining/selecting means 406. In the vector combining/selecting means 406 of FIG. 23 the maximum absolute value detecting means 408 calculates four absolute values of CI, CQ, SI and SQ, and detects which of the four absolute values is maximum among them. The first vector combing means 407*a* outputs a combined vector ($G1_C$, $G1_S$) by the following equations:

$$G1_C = CI + \text{sign}[CI] \cdot |CQ| \quad (10a)$$

$$G1_S = SI + \text{sign}[CI \cdot CQ] \cdot |SQ| \quad (10b)$$

The second vector combining means 407*b* outputs a combined vector ($G2_C$, $G2_S$) by the following equations:

$$G2_C = CQ + \text{sign}[CQ] \cdot |CI| \quad (11a)$$

$$G2_S = SQ + \text{sign}[CI \cdot CQ] \cdot |SI| \quad (11b)$$

The third vector combining means 407*c* outputs a combined vector ($G3_C$, $G3_S$) by the following equations:

$$G3_C = CI + \text{sign}[SI \cdot SQ] \cdot |CQ| \quad (12a)$$

$$G3_S = SI + \text{sign}[SI] \cdot |SQ| \quad (12b)$$

The fourth vector combining means 407*d* outputs a combined vector ($G4_C$, $G4_S$) by the following equations:

$$G4_C = CQ + \text{sign}[SI \cdot SQ] \cdot |CI| \quad (13a)$$

$$G4_S = SQ + \text{sign}[SQ] \cdot |SI| \quad (13b)$$

In the above, sign[*] means the sign (~±1)) in [ ].

The selecting means 409 receives the detected signal from the maximum absolute value detecting means 408, and selects the combined correlation value (ΣC, ΣS) from among ($G1_C$, $G1_S$), ($G2_C$, $G2_S$), ($G3_C$, $G3_S$) and ($G4_C$, $G4_S$).

$$(\Sigma C, \Sigma S) = (G1_C, G1_S) \text{ (when } |CI| \text{ is maximum)} \quad (14a)$$

$$(\Sigma C, \Sigma S) = (G2_C, G2_S) \text{ (when } |CQ| \text{ is maximum)} \quad (14b)$$

$$(\Sigma C, \Sigma S) = (G3_C, G3_S) \text{ (when } |SI| \text{ is maximum)} \quad (14c)$$

$$(\Sigma C, \Sigma S) = (G4_C, G4_S) \text{ (when } |SQ| \text{ is maximum)} \quad (14d)$$

By such processing the influence of the carrier phase θc is excluded, and a combined vector in which the vectors of the correlations (CI, CQ) and (SI, SQ) face in the same direction is selected as a vector that is the most suitable for the timing phase estimation. For example, in the case of FIG. 28, a combined vector is selected which is obtained by adding the correlation value (CI, SI) with the correlation value (CQ, SQ) of the smaller vector length reversed to face in the same direction as does the former. The resulting correlation value (ΣC, ΣS) is such as shown in FIG. 33. In the case of FIG. 32, a combined vector is selected which is obtained by adding the correlation value (CQ, SQ) of the smaller vector length intact to the correlation value (CI, SI). The resulting correlation value (ΣC, ΣS) is such as shown in FIG. 34.

Incidentally, the vector combining/selecting means 406 may be adapted not only to select one of the four combined vectors pre-generated from CI, SI, CQ and SQ as described above in respect of FIG. 23 but also to activate any one of the combining means 407a, 407b, 407c and 407d based on the detected result by the maximum absolute detecting means 408 as depicted in FIG. 24, and in the latter case, too, the same output results as in the former case could be obtained. As compared with the configuration of FIG. 23, the FIG. 24 configuration permits reduction of the scale of circuitry. In the vector combining/selecting means depicted in FIG. 24, selecting means 411a, 411b, 411c and 411d output the following values based on the detected results by the maximum absolute value detecting means 408.

The output SEL1 from the first selecting means 411a is:

SEL1=CI (when |CI| or |SI| is maximum)　　(15a)

SEL1=CQ (when |CQ| or |SQ| is maximum)　　(15b)

The output SEL2 from the second selecting means 411b is:

SEL2=sign[CI]·|CQ| (when |CI| is maximum)　　(16a)

SEL2=sign[CQ]·|CI| (when |CQ| is maximum)　　(16b)

SEL2=sign[SI·SQ]·|CQ| (when |SI| is maximum)　　(16c)

SEL2=sign[SI·SQ]·|CI| (when |SQ| is maximum)　　(16d)

The output SEL3 from the third selecting means 411c is:

SEL3=sign[CI·CQ]·|SQ| (when |CI| is maximum　　(17a)

SEL3=sign[CI·CQ]·|SI| (when |CQ| is maximum)　　(17b)

SEL3=sign[SI]·|SQ| (when |SI| is maximum)　　(17c)

SEL3=sign[SQ]·|SI| (when |SQ| is maximum)　　(17d)

The output SEL4 from the fourth selecting means 411d is:

SEL4=SI (when |CI| or |SI| is maximum)　　(18a)

SEL4=SQ (when |CQ| or |SQ| is maximum)　　(18b)

An adder 410a adds SEL1 and SEL2 together and outputs ΣC as the added result. An adder 410b adds SEL3 and SEL4 together and outputs ΣS as the added result.

By the above processing the vector combining/selecting means of the FIG. 24 construction outputs the same values as those provided by the vector combining/selecting means of the FIG. 23 construction.

Next, the timing phase difference calculating means 403a calculates the vector angle $$\theta_{2s}=\tan^{-1}(\Sigma S/\Sigma C) \quad (19)$$

that the composite correlation value (ΣC, ΣS) indicates. $\theta_{2s}$ is the timing phase angle when normalized by a two-symbol period (2T) as is the case with the aforementioned $\theta_T$, and accordingly, the timing phase difference θs [deg] when normalized by the symbol period (T) is given by Equation (20).

$$\theta s=2\theta_{2s} \bmod 360 \quad (20)$$

θ2s in the case of FIG. 33 and θ2s in the case of FIG. 34 differ by 180 [deg], but by the processing of Equation (20), θs derived from θ2s in FIG. 33 and θs derived from θ2s in FIG. 34 match each other.

Incidentally, the relationship between the timing phase difference θs and the timing error τ is such as indicated by Equations (5a) and (5b).

Based on the timing error τ obtained by the above operation, the timing phase difference calculating means 403a supplies the VCO 404 of the following stage with a control signal which cancels the timing errorτ. Upon receiving the control signal from the timing phase difference calculating means, the VCO 404 controls the phases the recovered sample clock and the recovered symbol clock to reduce the timing errors down to "0".

As described above, the two timing recovery devices 400 and 400a using the preamble in the prior art examples both calculate the correlation between the ½ symbol frequency component contained in the preamble signal and the ½ symbol frequency component exp[−jπ(fs)t] output from the VCO, and estimate the timing phase from the vector angle indicated by the correlation value, and since the sampling rate is as low as 2 [sample/symbol], the conventional schemes are particularly effective in the broadband radio communication system, but either of them is provided with means for excluding the influence of the carrier phase differenceθc, which enlarges the scale of circuitry and increases the computational complexity.

For example, the timing recovery device 400 performs differential detection by the one-symbol delay means 401 and the conjugate complex multiplying means 402 to exclude the influence of the carrier phaseθc. To this end, the conjugate complex multiplying means 402 requires four multipliers and two adders, and hence involves a large circuit scale and a large amount of operation.

The timing recovery device 400a performs complex add-subtract processing and select processing by the vector combining/selecting means 406 to exclude the influence of the carrier phase differenceθc. In the case of selecting one of the four combined vectors pre-generated from CI, SI, CQ and SQ, the vector combining/selecting means 406 requires a total of eight adders contained in the combining means 407a, 407b, 407c and 407d, and the selecting means 409 for selecting two data sequences from among eight data sequences.

Further, in the case of implementing the vector combining/selecting means 406 by the FIG. 24 configuration, since the number of adders can be decreased from eight to two, the circuit scale can be reduced as compared with the FIG. 23 configuration, but even this configuration requires the four selecting means 411a, 411b, 411c and 411d in the preceding stages of the adders 410a and 410b, and involves complicated processing.

Besides, the above-described timing recovery devices 400 and 400a are effective only in the case where the timing for receiving the preamble signal is known; for example, in the case where the timing for receiving a burst signal, which is generated at turn0on of a mobile terminal equipment or at its reconnection after return from shadowing, is unknown, the timing for receiving the preamble is not known, and hence the conventional timing recovery devices cannot be used.

The present invention has for its object to provide a timing recovery device that solves such problems as described above and permits reduction of the circuit scale and computational complexity, and a demodulator using the timing recovery device.

Another object of the present invention is to provide a timing recovery device effective for either of a signal (for example,"1101" pattern) that performs an alternate transition between two adjacent Nyquist points in a complex plane upon each occurrence of a symbol and a "0π" modulation signal (for example, "1001" pattern) that performs an alternate transition between two origin-symmetric Nyquist points in the complex plane upon each occurrence of a symbol, and a demodulator using the timing recovery device.

Still another object of the present invention is to provide a timing recovery device that is effective even when the timing for receiving a preamble is not known, and a demodulator using the recovery device.

DISCLOSURE OF THE INVENTION

A timing recovery device according to an aspect of the present invention is characterized by the provision of: adding means for adding together an in-phase component of a base band signal and a quadrature component of the base band signal and for outputting a signal after the addition as an added signal; subtracting means for subtracting the in-phase component of the base band signal and the quadrature component of the base band signal from each other and for outputting a signal after the subtraction as a subtracted signal; added value correlation calculating means for calculating the correlation between said added signal and a ½ symbol frequency component generated at the receiver side, and for outputting the calculated correlation value as an added correlation signal; subtracted value correlation calculating means for calculating the correlation between said subtracted signal and said ½ symbol frequency component, and for outputting the calculated correlation value as a subtracted correlation signal; vector selecting means for comparing the magnitude of said added correlation signal and the magnitude of said subtracted correlation signal, for selecting the correlation signal of the larger magnitude, and for outputting the selected correlation signal as a selected correlation signal; and timing phase difference calculating means for calculating a timing phase difference through utilization of the vector angle indicated by said selected correlation signal.

According to another aspect of the invention, the timing recovery device is characterized in that said timing phase difference calculating means calculates the vector angle and the vector length indicated by said selected correlation signal, and when said vector length is large, decides that said preamble signal is detected, and calculates the timing phase difference through utilization of the vector angle indicated by said selected correlation signal at that time.

According to another aspect of the invention, the timing recovery device is characterized by further provision of recovered sample clock oscillating means for outputting a recovered sample clock for sampling said base band signal and a recovered ½ symbol frequency component, and for effecting phase control to reduce a timing error down to "0" through utilization of said timing phase difference information.

According to another aspect of the invention, the timing recovery device is characterized in that: said added value correlation calculating means, said subtracted value correlation calculating means, said vector selecting means, said timing phase difference calculating means and said recovered sample clock oscillating means use, for their processing, a base band signal sampled by said recovered sample clock; and said added value correlation calculating means and said subtracted value correlation calculating means render said ½ symbol frequency component to said recovered ½ symbol frequency component.

According to another aspect of the invention, the timing recovery device is characterized by further provision of: phase detecting means for detecting the timing phase through the use of said base band signal sampled by said recovered sample clock and for outputting the detected signal as a phase detected signal; and phase detected signal averaging means for averaging said phase detected signal and for outputting the average as a phase lead/lag signal; wherein said recovered sample clock oscillating means uses both of said timing phase difference information and said phase lead/lag signal to effect phase control to reduce the timing error down to"0".

According to another aspect of the invention, the timing recovery device is characterized by further provision of asynchronous sample clock oscillating means for outputting an asynchronous sample clock for sampling said base band signal and an asynchronous ½ symbol frequency component.

According to another aspect of the invention, timing recovery device is characterized in that: said added value correlation calculating means, said subtracted value correlation calculating means, said vector selecting means, said timing phase difference calculating means and said asynchronous sample clock oscillating means use, for their processing, the base band signal sampled by said asynchronous sample clock; and the added value correlation calculating means and said subtracted value correlation calculating means render said ½ symbol frequency component to said asynchronous ½ symbol frequency component.

A timing recovery device according to another aspect of the invention is characterized by the provision of: adding means for adding together an in-phase component of a base band signal and a quadrature component of the base band signal and for outputting a signal after the addition as an added signal; subtracting means for subtracting the in-phase component of the base band signal and the quadrature component of the base band signal from each other and for outputting a signal after the subtraction as a subtracted signal; added value correlation calculating means for calculating the correlation between said added signal and a ½ symbol frequency component generated at the receiver side, and for outputting the calculated correlation value as an added correlation signal; subtracted value correlation calculating means for calculating the correlation between said subtracted signal and said ½ symbol frequency component, and for outputting the calculated correlation value as a subtracted correlation signal; vector selecting means for comparing the magnitude of said added correlation signal and the magnitude of said subtracted correlation signal, for selecting the correlation signal of the larger magnitude, and for outputting the selected correlation signal as a selected correlation signal; weighting means for weighting said selected correlation signal in accordance with the magnitude of the vector length indicated by said selected correlation signal, and for outputting said weighted selected correlation signal as a weighted correlation signal; weighted signal-averaging means for averaging said weighted correlation signal and for outputting the average as a weighted average correlation signal; and timing phase difference calculating means for calculating a timing phase difference through utilization of the vector angle indicated by said averaged correlation signal.

According to another aspect of the invention, the timing recovery device is characterized in that said timing phase difference calculating means calculates the vector angle and vector length indicated by said weighted average correlation signal, and when said vector length is large, detects that said preamble signal is detected, and calculates the timing difference through utilization of the vector angle indicated by said selected correlation signal at that time.

According to another aspect of the invention, the timing recovery device is characterized by further provision of recovered sample clock oscillating means for outputting a recovered sample clock for sampling said base band signal and a recovered ½ symbol frequency component, and for effecting phase control to reduce a timing error down to "0" through utilization of said timing phase difference information.

According to another aspect of the invention, the timing recovery device is characterized in that: said added value correlation calculating means, said subtracted value correlation calculating means, said vector selecting means, said weighting means, said weighted signal averaging means, said timing phase difference calculating means and said recovered sample clock oscillating means use, for their processing, a base band signal sampled by said recovered sample clock; and said added value correlation calculating means and said subtracted value correlation calculating means render said ½ symbol frequency component to said recovered ½ symbol frequency component.

According to another aspect of the invention, the timing recovery device is characterized in that: said weighted signal averaging means comprises a first low-pass filter of a small time constant and a second low-pass filter of a large time constant which are supplied with tsaid weighted correlation signal, and at the time of phase control, sets "0" in a quadrature component and (in-phase component$^2$+ quadrature component$^2$)$^{1/2}$ prior to the phase control in an in-phase component in each of said first and second low-pass filters; said timing phase difference calculating means calculates a first vector angle and a first vector length indicated by said first low-pass filter, and when said vector length is large, decides that said preamble signal is detected, calculates an initial timing phase difference through the use of said first vector angle, calculates a second vector angle and a second vector length indicated by said second low-pass filter, and when said second vector length is large after said first phase control, periodically calculates a timing phase difference for phase following use through the use of said second vector angle; and said recovered sample clock oscillating means uses both of said initial timing phase difference and said phase-following timing phase difference as said timing phase difference information to effect phase control to reduce the timing error down to "0".

According to another aspect of the invention, the timing recovery device is characterized by further provision of asynchronous sample clock oscillating means for outputting an asynchronous sample clock for sampling said base band signal and an asynchronous ½ symbol frequency component.

According to another aspect of the invention, the timing recovery device is characterized in that: said added value correlation calculating means, said subtracted value correlation calculating means, said vector selecting means, said weighting means, said weighted signal averaging means, said timing phase difference calculating means and said asynchronous sample clock oscillating means use, for their processing, a base band signal sampled by said asynchronous sample clock; and said added value correlation calculating means and said subtracted value correlation calculating means render said ½ symbol frequency component to said asynchronous ½ symbol frequency component.

According to another aspect of the invention, the timing recovery device is characterized in that: said weighted signal averaging means further comprises a first low-pass filter of a small time constant and a second low-pass filter of a large time constant which are supplied with said weighted correlation signal; and said timing phase difference calculating means calculates a first vector angle and a first vector length indicated by said first low-pass filter, and when said first vector length is large, decides that said preamble signal is detected, calculates an initial timing phase difference through the use of said first vector angle, calculates a second vector angle and a second vector length indicated by said second low-pass filter, and when said second vector length is large after said first phase control, periodically calculates a timing phase difference for phase following use through the use of said second vector angle.

A demodulator according to another aspect of the present invention is characterized by the provision of: a timing recovery device; an antenna for receiving a radio signal; frequency converting means for frequency converting said radio signal received by said antenna to a base band signal; A/D converting means for sampling said base band signal converted by said frequency converting means at a rate twice higher than a symbol rate through the use of said recovered sample clock for conversion to a digital base band signal for application to said timing recovery device; and data decision means for extracting Nyquist point data from said digital base band signal through the use of a recovered symbol clock output from said timing recovery device, for making a decision on said extracted Nyquist point data and for outputting said decided Nyquist point data as demodulated data.

A demodulator according to another aspect of the present invention is characterized by the provision of: a timing recovery device; an antenna for receiving a radio signal; frequency converting means for frequency converting said radio signal received by said antenna to a base band signal; A/D converting means for sampling the base band signal converted by said frequency converting means at a rate twice higher than a symbol rate through the use of said asynchronous sample clock for conversion to a digital base band signal for application to said timing recovery device; data interpolating means for interpolating said digital base band signal sampled by the asynchronous sample clock output from said timing recovery device, and for outputting the interpolated data as an interpolated base band signal; and data decision means for extracting a Nyquist point of the interpolated digital base band signal output from said data interpolating means based on said timing phase difference, for making a decision on said extracted Nyquist point data and for outputting the decided Nyquist point data as demodulated data.

A demodulator according to another aspect of the present invention is characterized by the provision of: a timing recovery device; an antenna for receiving a radio signal; frequency converting means for frequency converting the radio signal received by said antenna to a base band signal;

A/D converting means for sampling the base band signal converted by said frequency converting means at a rate twice higher than a symbol rate through the use of an asynchronous sample clock for conversion to a digital base band signal for application to said timing recovery device; data interpolating means for interpolating said digital base band signal sampled by the asynchronous sample clock output from the timing recovery device, and for outputting the interpolated data as an interpolated base band signal; and data decision means for extracting a Nyquist point of the interpolated digital base band signal output from said data interpolating means based on both of said initial timing phase difference and said timing phase difference for phase following use, for making a decision on said extracted Nyquist point data and for outputting the decided Nyquist point data as demodulated data.

BEST MODE FOR CARRYING OUT THE INVENTION

A description will be given below, with reference to the accompanying drawings, of the preferred embodiments of the timing recovery device according to the present invention and the demodulator using the device.

Embodiment 1

Figure 1:
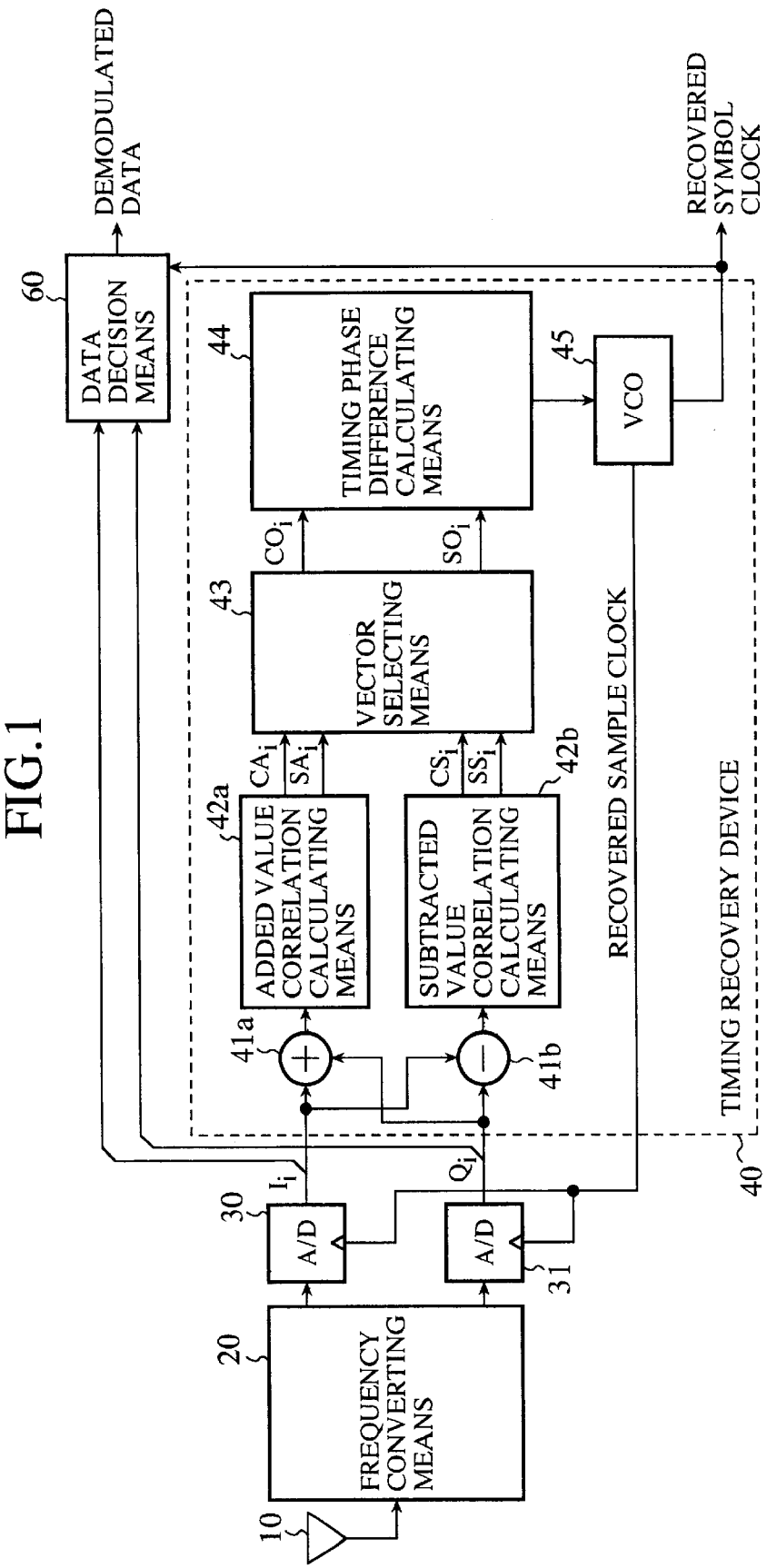
FIG. 1 is a block diagram illustrating the configuration of a demodulator according to Embodiment 1.

FIG. 1 is a block diagram illustrating the configuration of a demodulator according to Embodiment 1. In FIG. 1, reference numeral 10 denotes an antenna for receiving a radio signal; 20 denotes frequency converting means for frequency converting the radio signal received by the antenna 10 to a base band signal; 30 and 31 denote A/D converters each for sampling the base band signal frequency converted by the frequency converting means 20 at a rate twice higher than a symbol rate for conversion to a digital base band signal; 40 denotes a timing recovery device for performing timing synchronization, using the digital base band signals converted by the A/D converting means 30 and 31; and 60 denotes data decision means which extracts Nyquist point data from the digital base band signals through the use of a recovered symbol clock output from the timing recovery device 40 and makes a decision on the extracted Nyquist point data.

Figure 2:
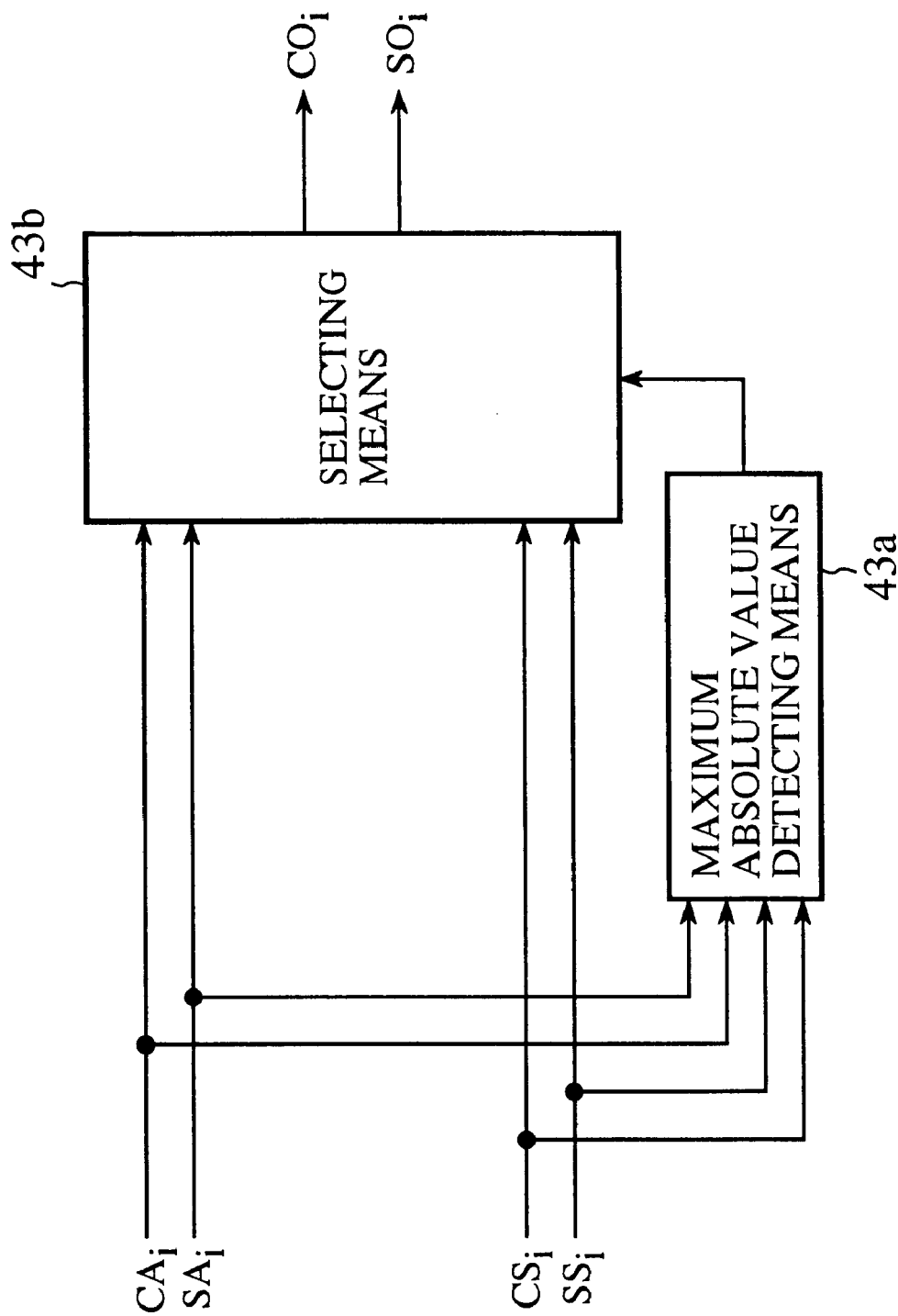
FIG. 2 is a block diagram illustrating the configuration of vector selecting means.

In the timing recovery device 40, reference numeral 41*a* denotes adding means for adding together an in-phase component of the base band signal and a quadrature component of the base band signal; 41*b* denotes subtracting means for subtracting the in-phase component of the base band signal and the quadrature component of the base band signal from each other; 42*a* denotes added value correlation calculating means for calculating the correlation between the added signal and a ½ symbol frequency component; 42*b* denotes subtracted value correlation calculating means for calculating the correlation between the subtracted signal and the ½ symbol frequency component; 43 denotes vector selecting means which compares the magnitude of the added value correlation signal and the magnitude of the subtracted value correlation signal and selects the correlation signal of the larger magnitude; 44 denotes timing phase difference calculating means for calculating a timing phase difference, using the vector angle indicated by the selected correlation signal; and 45 denotes a VCO (recovered sample clock oscillating means) which controls the phases of a recovered sample clock and the recovered symbol clock to reduce a timing error down to "0". FIG. 2 is a block diagram of the vector selecting means 43, in which reference numeral 43a denotes maximum absolute value detecting means and 43b selecting means.

Next, the operation of the demodulator according to Embodiment 1 will be described. The antenna 10 receives a burst signal of the RF band, and the frequency converting means 20 frequency converts the RF-band burst signal to a base band burst signal. This burst signal begins with a preamble signal, which is followed by a significant data.

Figure 18:
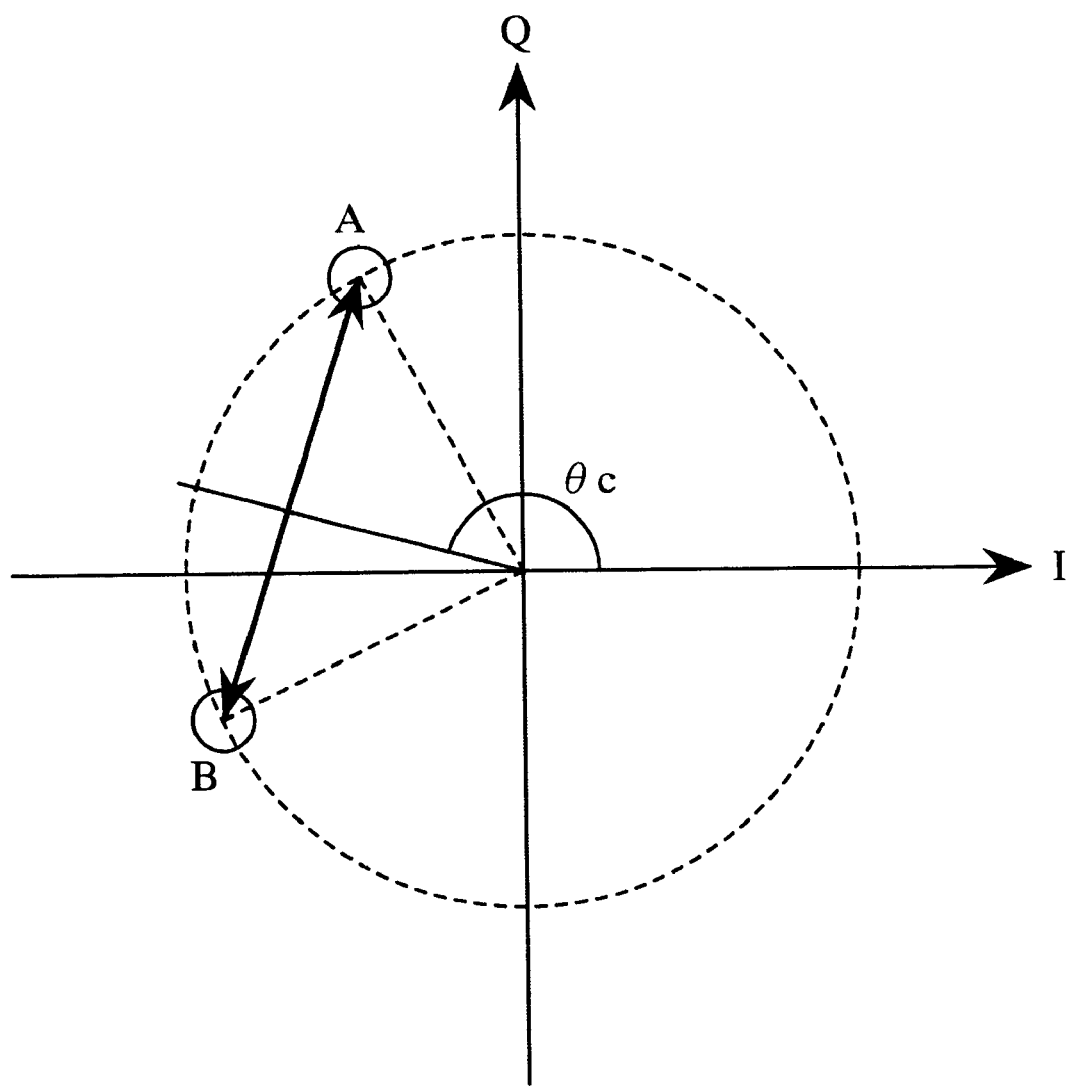
FIG. 18 is a signal space diagram showing a "1101" pattern.
Figure 19:
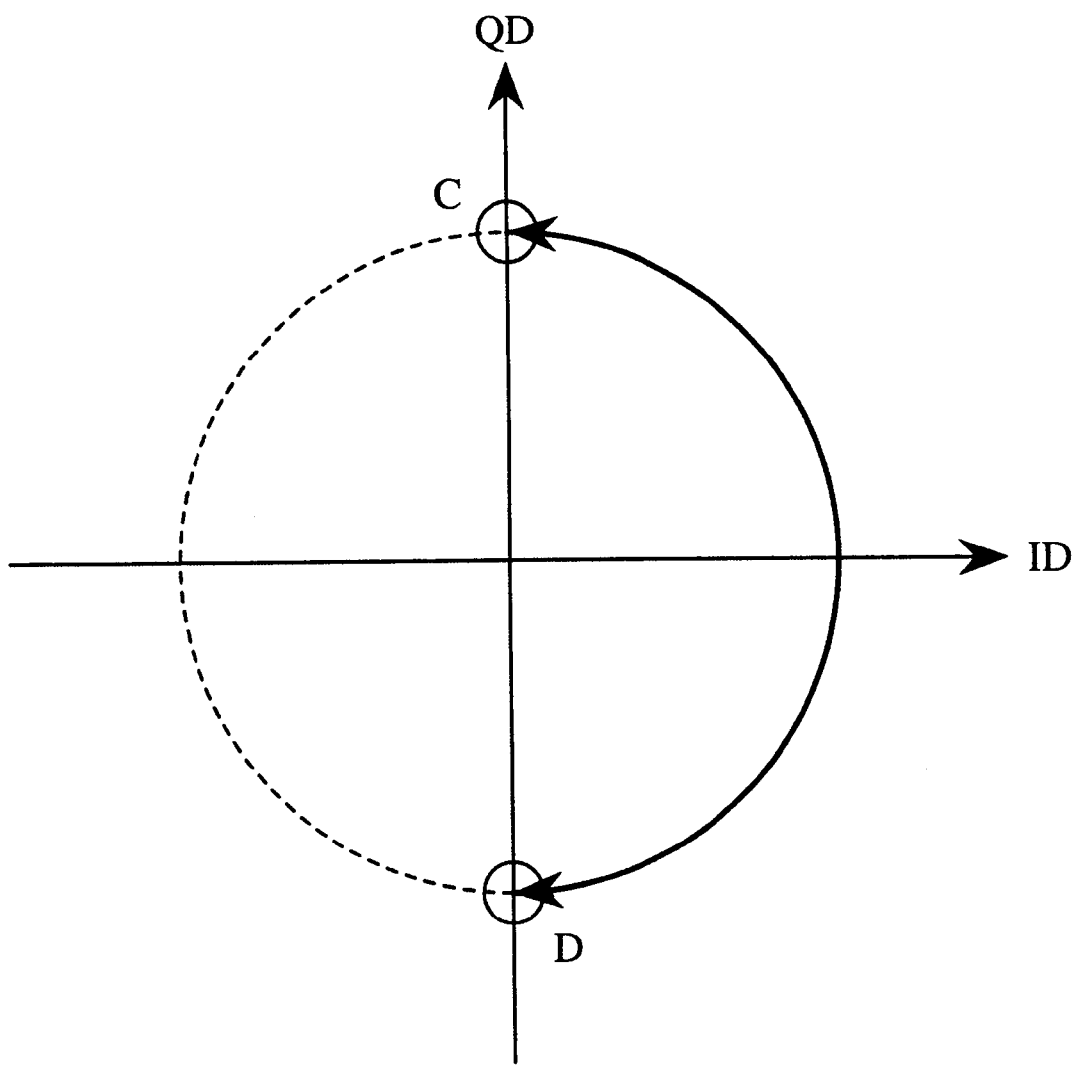
FIG. 19 is a signal space diagram showing a conjugate complex multiplying means output.
Figure 20:
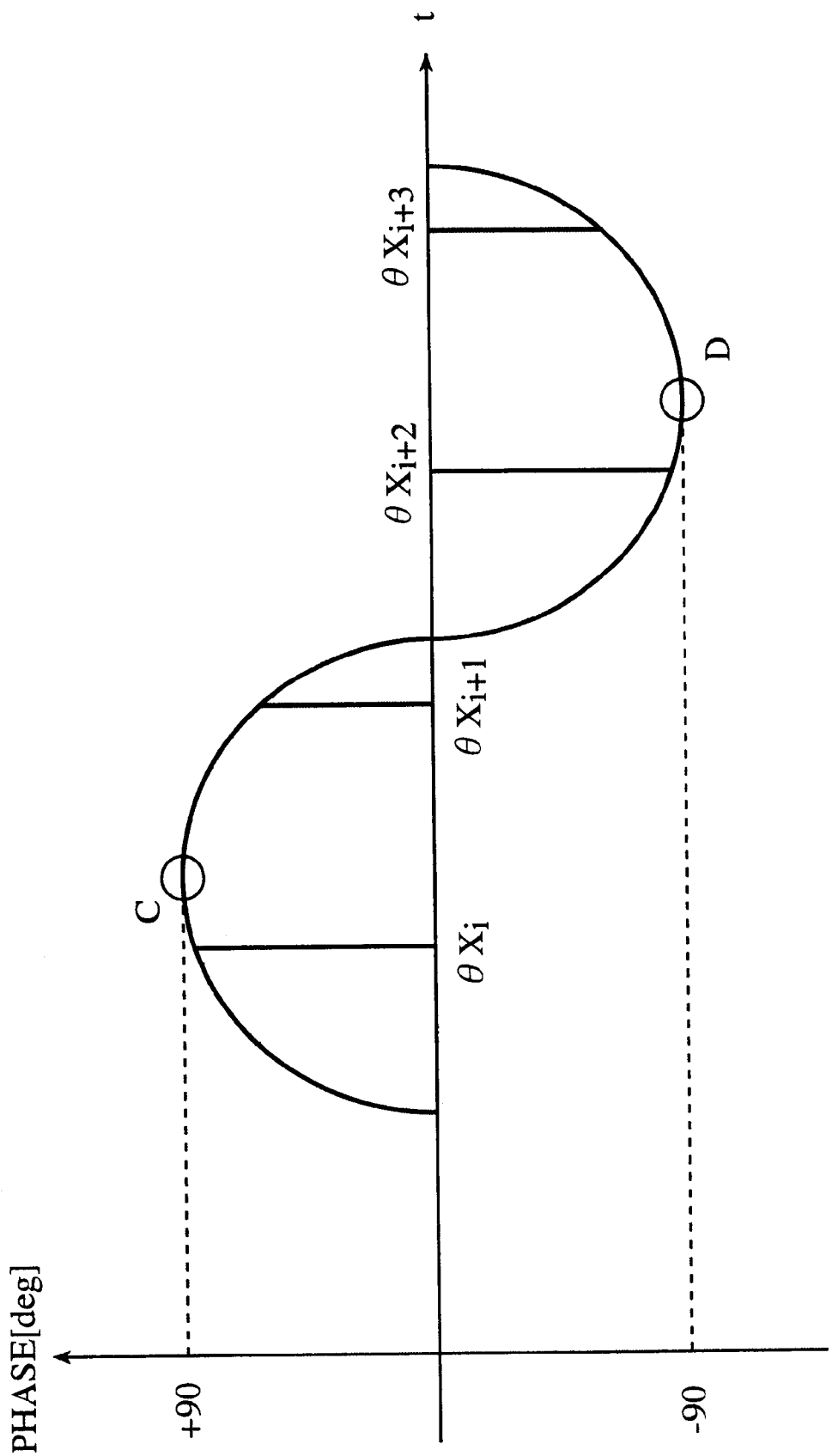
FIG. 20 is a signal space diagram showing a conjugate complex multiplying means output.
Figure 21:
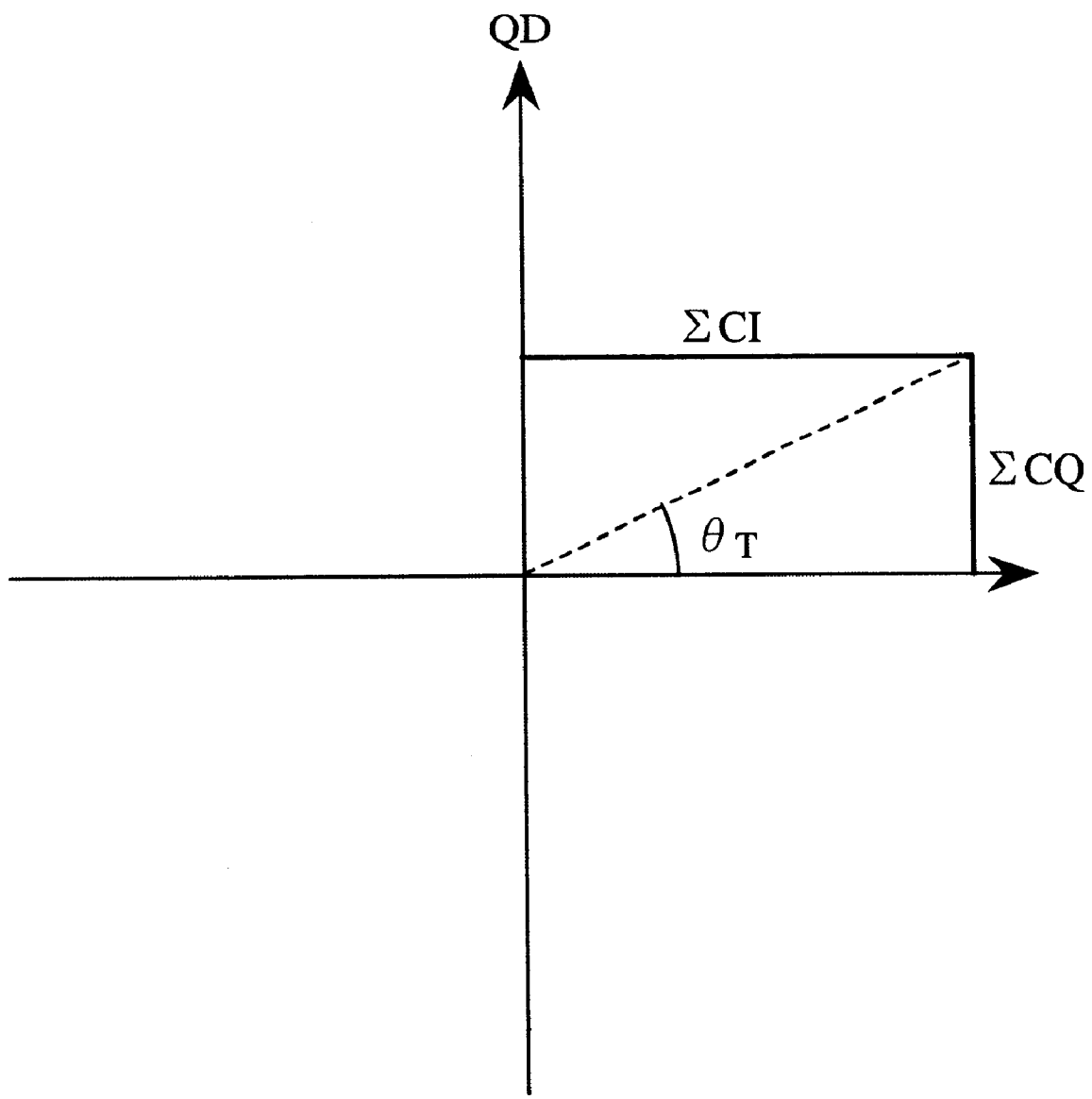
FIG. 21 is a diagram showing a correlation value and a timing error.
Figure 22:
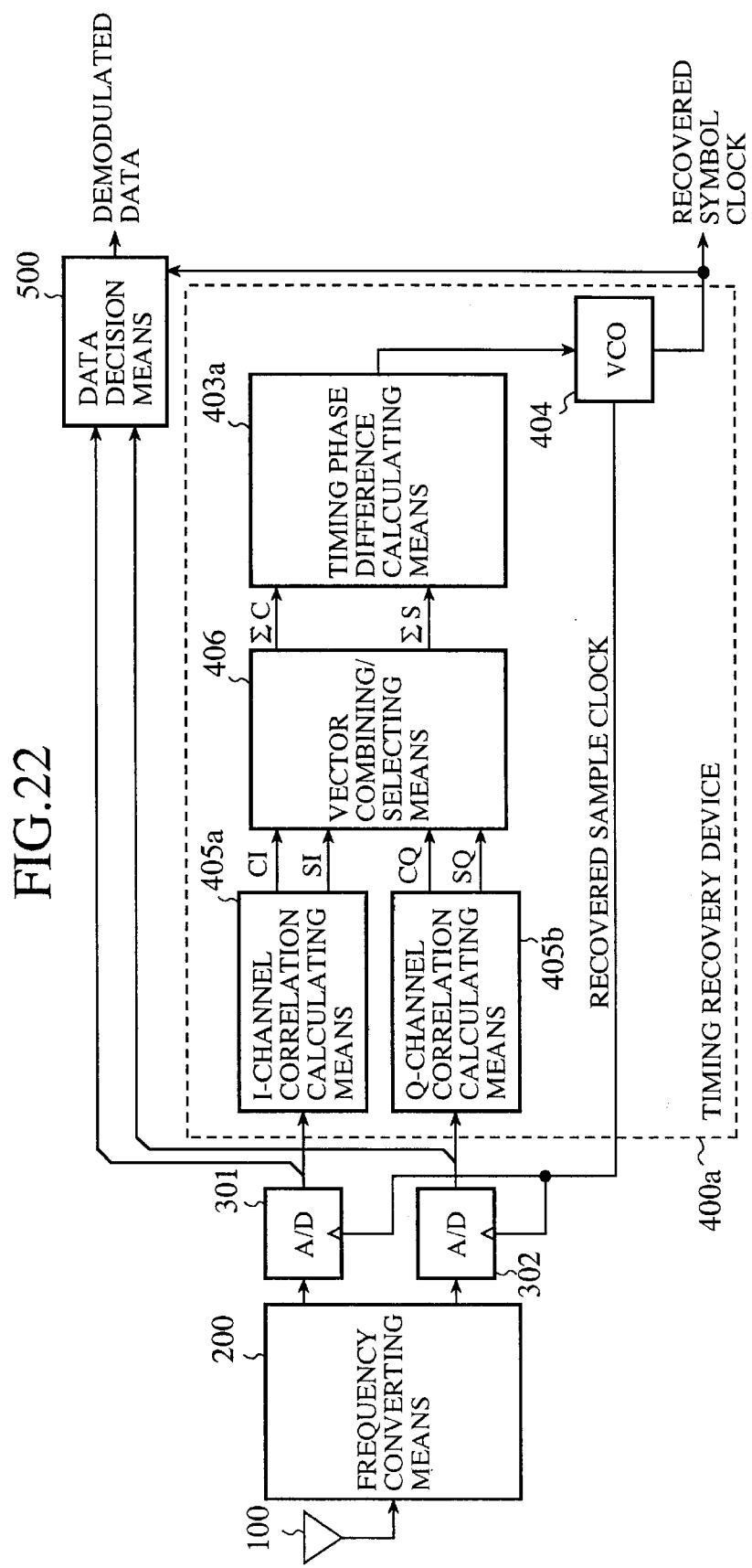
FIG. 22 is a block diagram depicting configuration of another conventional demodulator.
Figure 25:
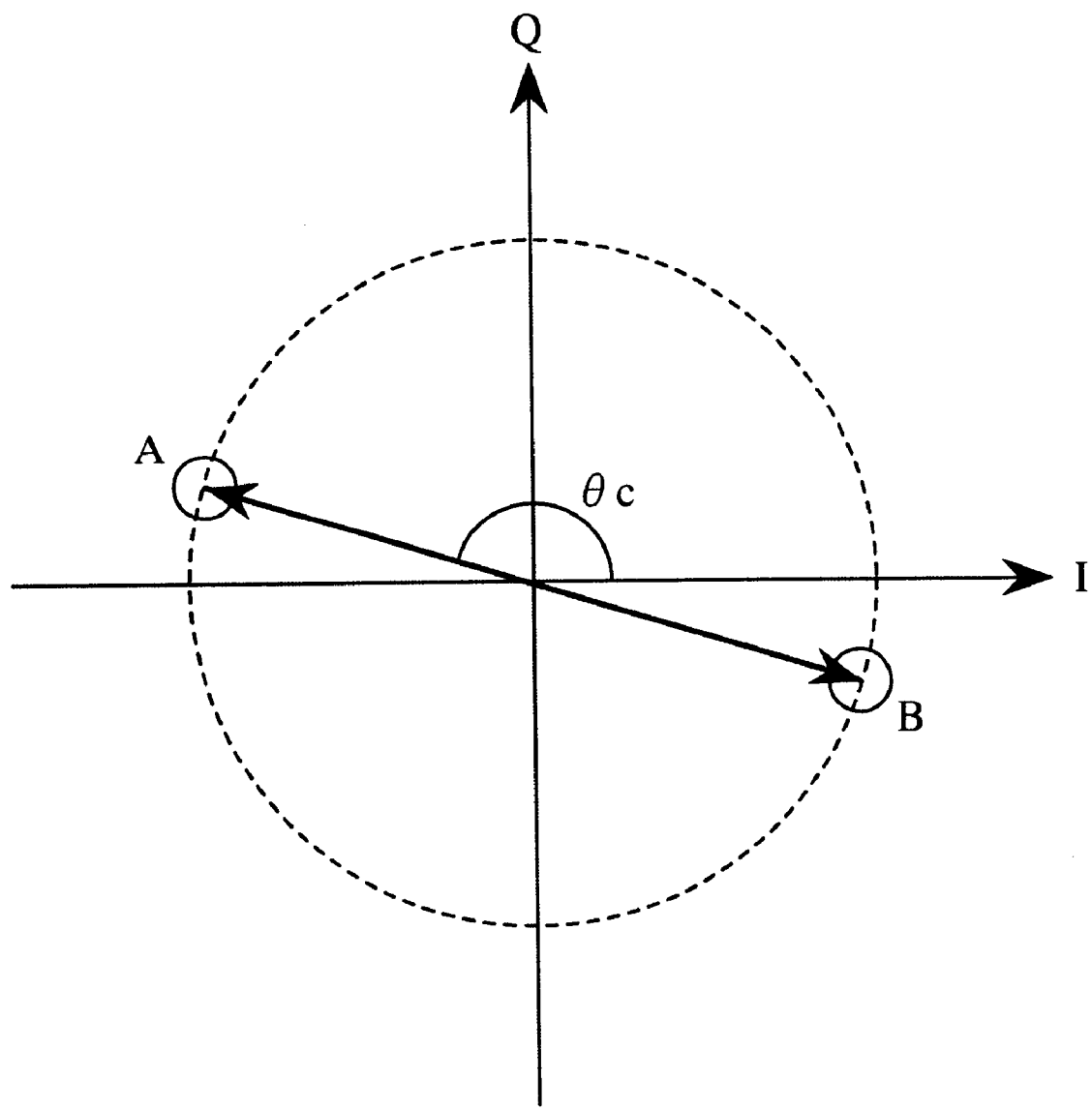
FIG. 25 is a signal space diagram showing a "1001" pattern.

The preamble signal for use in Embodiment 1 may be either such a signal (for example, "1101" pattern) as depicted in FIG. 18 or such a signal (for example, "1001" pattern) as depicted in FIG. 25.

The A/D converter 30 samples the in-phase component of the received base band signal at time $t=\tau+iT/2$ (where $i=1,2,3,\ldots$, $\tau$ is a timing error ($-T/2 \leq \tau < T/2$), and T is a symbol period), and outputs a sampled data sequence $I_i$ (where $i=1,2,3,\ldots$). Similarly, the A/D converter 31 samples the quadrature component of the received base band signal at time $t=\tau+iT/2$, and outputs a sampled received data sequence $Q_i$ (where $i=1,2,3,\ldots$).

The timing recovery device 40 uses the received data sequence $I_i$ (where $i=1,2,3,\ldots$) and the received data sequence $Q_i$ (where $i=1,2,3,\ldots$) to detect a preamble signal ($Ip_i$, $Qp_i$) in the burst signal and calculate the timing error $\tau$ through the use of the preamble signal, and effects phase control of the recovered sample clock and the recovered symbol clock to cancel the timing error $\tau$. The recovered symbol clock is a clock of the symbol period obtained by frequency dividing the recovered sample clock down to ½.

The data decision means 60 latches, by the recovered symbol clock, data at the Nyquist points from significant random data sequences $Id_i$ and $Qd_i$ (where $i=1,2,3,\ldots$) following the preamble after the detection of the preamble and cancellation of the timing error $\tau$ by the timing recovery device 40. And the data decision means uses the latched Nyquist point data to decide data, and outputs demodulated data.

Next, the operation of the timing recovery device 40 will be described. In the first place, the adding means 41a adds together an in-phase component I(t) and a quadrature component (Q(t) of the received signal, and outputs the result of addition as an added signal. On the other hand, the subtracting means 41b subtracts the in-phase component I(t) and quadrature component Q(t) of the preamble signal from each other, and outputs the result of subtraction as a subtracted signal. This subtraction may be either (I(t)−Q(t)) or (Q(t)−I(t)). Concretely, the adding means 41a outputs the added signal shown in FIG. 3 by the following equation (21a).

$$A_i = I_i + Q_i \quad (21a)$$

Figure 4:
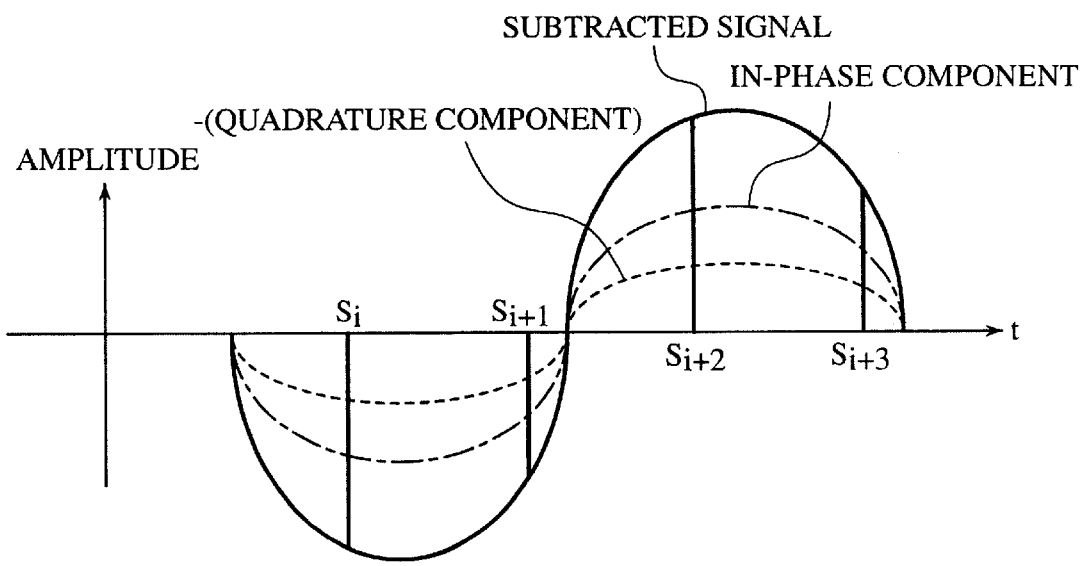
FIG. 4 is a waveform diagram showing a subtracted signal of the preamble.

The subtracting means 41b outputs the subtracted signal shown in FIG. 4 by the following equation (21b).

$$S_i = I_i - Q_i \quad (21b)$$

With these simple adding means 41a and subtracting means 41b, it is possible for the timing recovery device 40, in the case of receiving the preamble signal ($I_i=Ip_i$, $Q_i=Qp_i$), to obtain either the added signal or subtracted signal having a large ½ symbol frequency component, irrespective of the value of the carrier phase $\theta c$ [deg].

Figure 3:
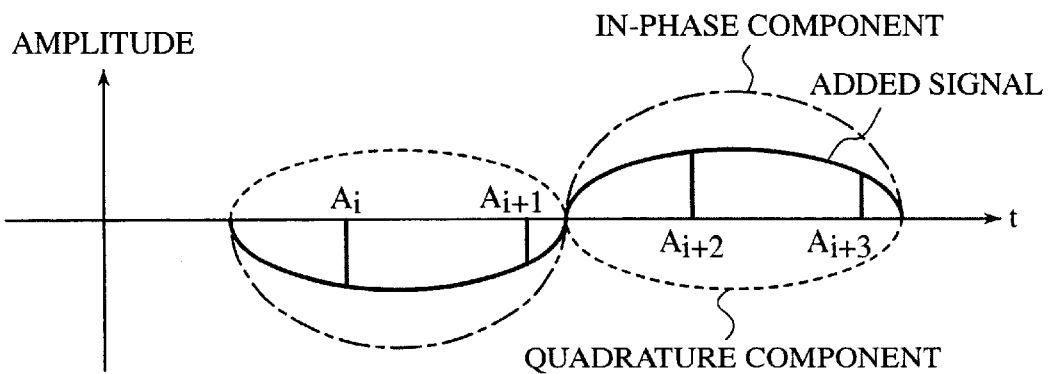
FIG. 3 is a waveform diagram showing an added signal of a preamble.
Figure 26:
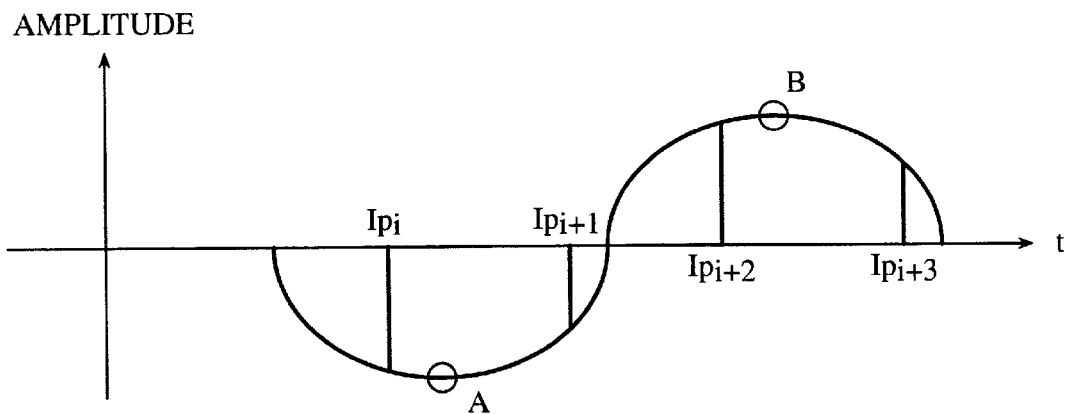
FIG. 26 is a waveform diagram showing an in-phase component of a preamble signal.
Figure 27:
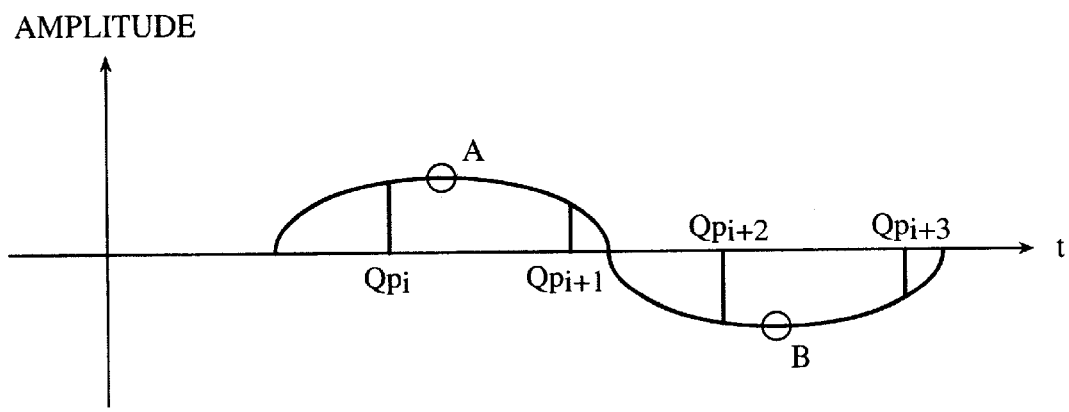
FIG. 27 is a waveform diagram showing a quadrature component of the preamble signal.
Figure 28:
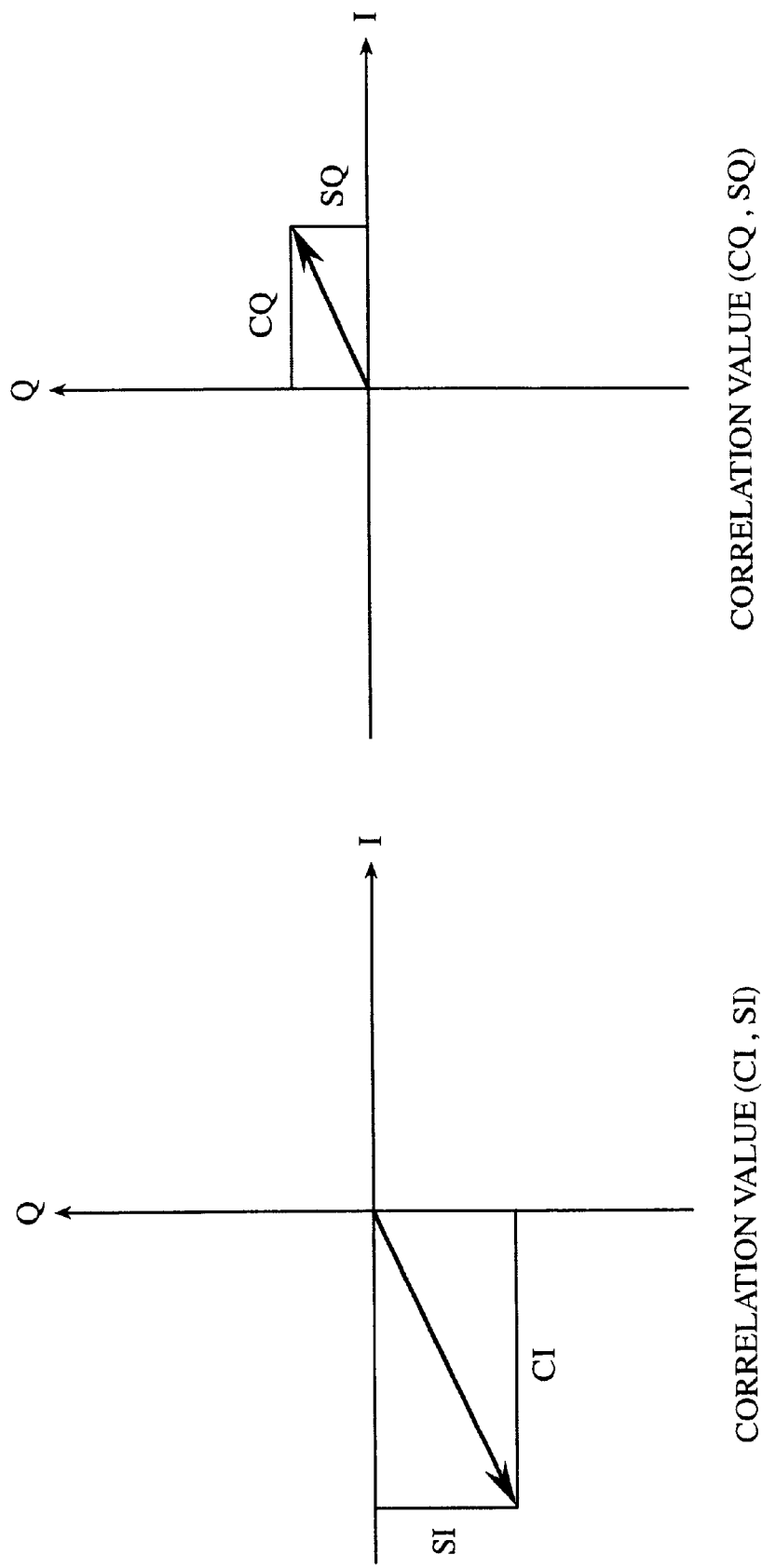
FIG. 28 is a signal space diagram showing an example of the correlation value.

For instance, when the carrier phase $\theta c$ [deg] is in the range of ($90<\theta c<180$) or ($270<\theta c<360$) as shown in FIG. 25, the in-phase component and quadrature component of the preamble signal are opposite in phase as shown in FIGS. 26 and 27; since the in-phase and quadrature components of the preamble signal cancel each other as shown in FIG. 3, the amplitude of the added signal is reduced, whereas the amplitude of the subtracted signal is increased by the combining of the in-phase component and − (quadrature component of the preamble signal as depicted in FIG. 4.

Figure 7:
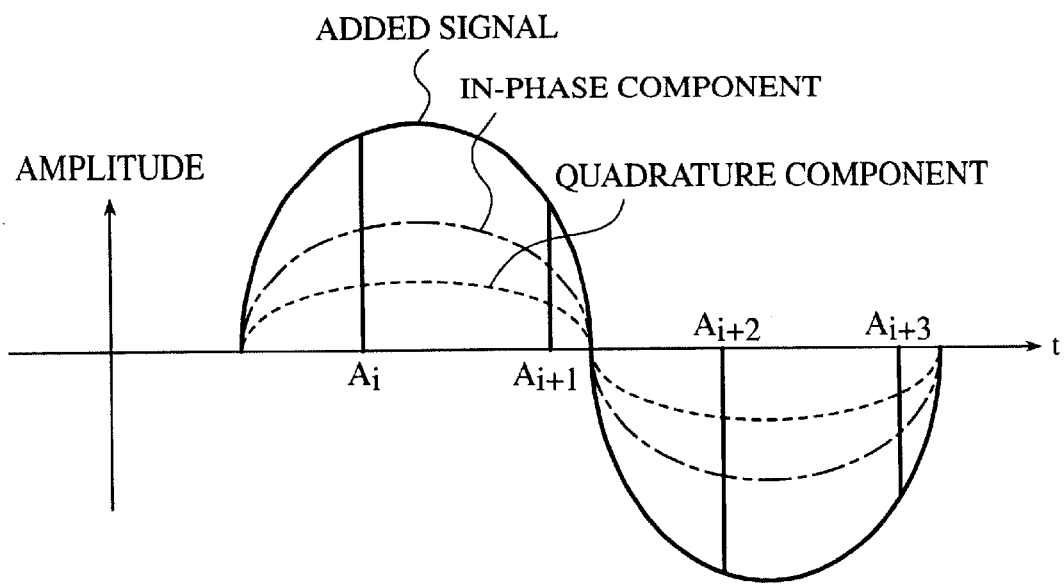
FIG. 7 is a waveform diagram showing an added signal of the preamble.
Figure 8:
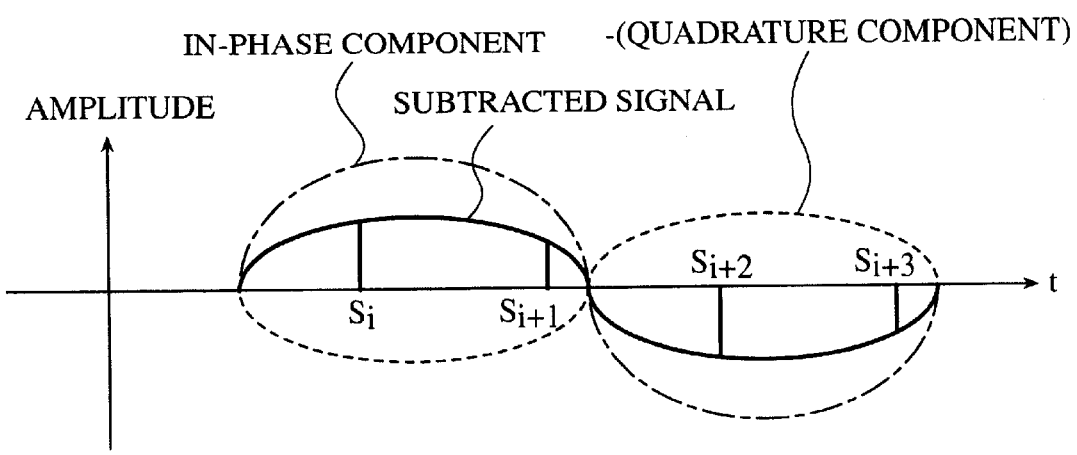
FIG. 8 is a waveform diagram showing a subtracted signal of the preamble.
Figure 29:
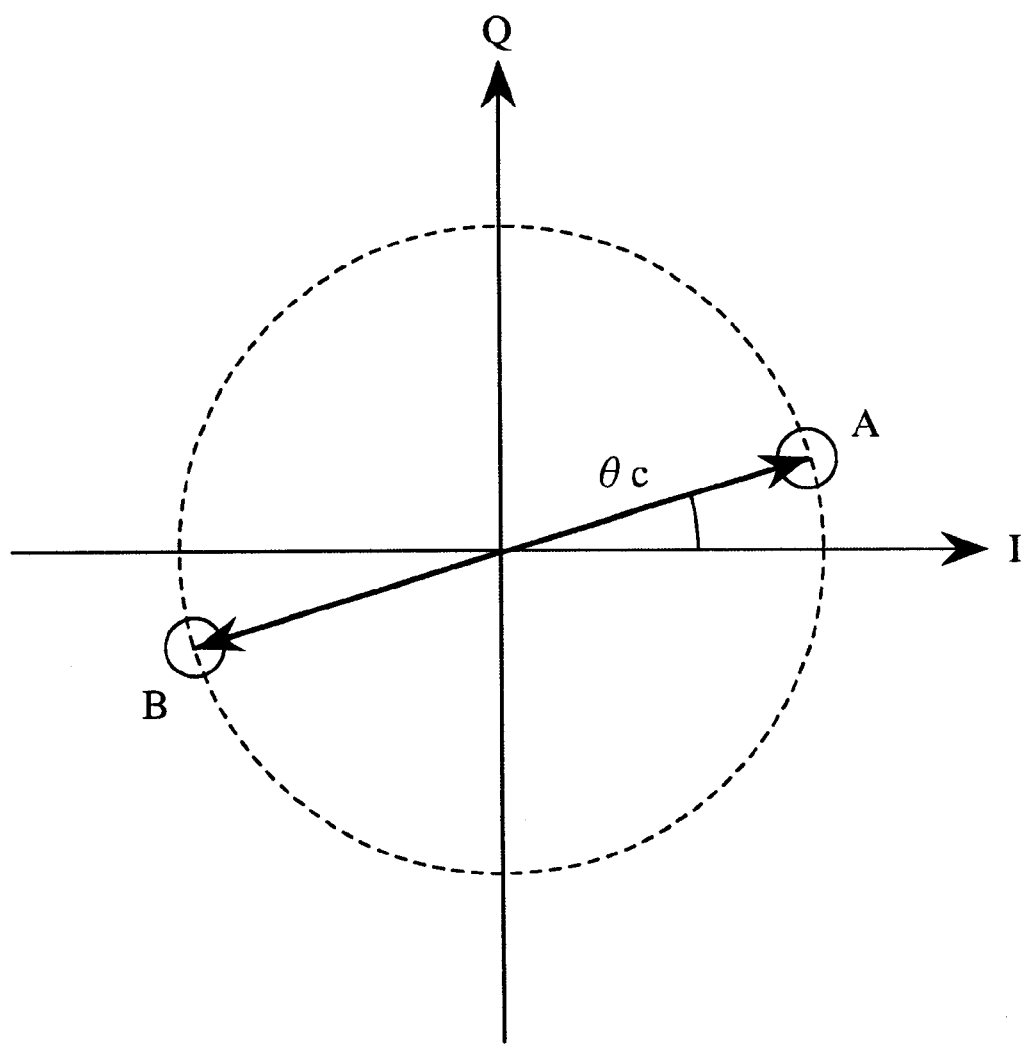
FIG. 29 is a signal space diagram showing a "1001" pattern.
Figure 31:
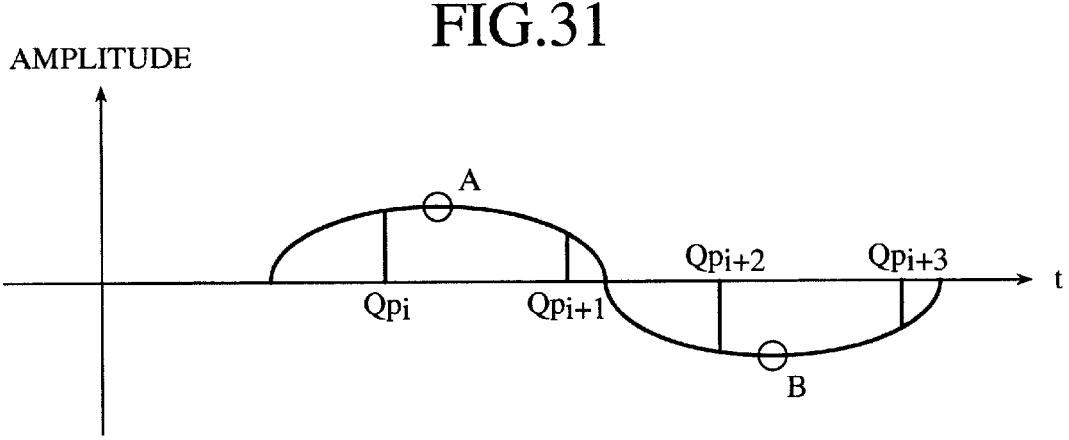
FIG. 31 is a waveform diagram showing a quadrature component of the preamble signal.
Figure 32:
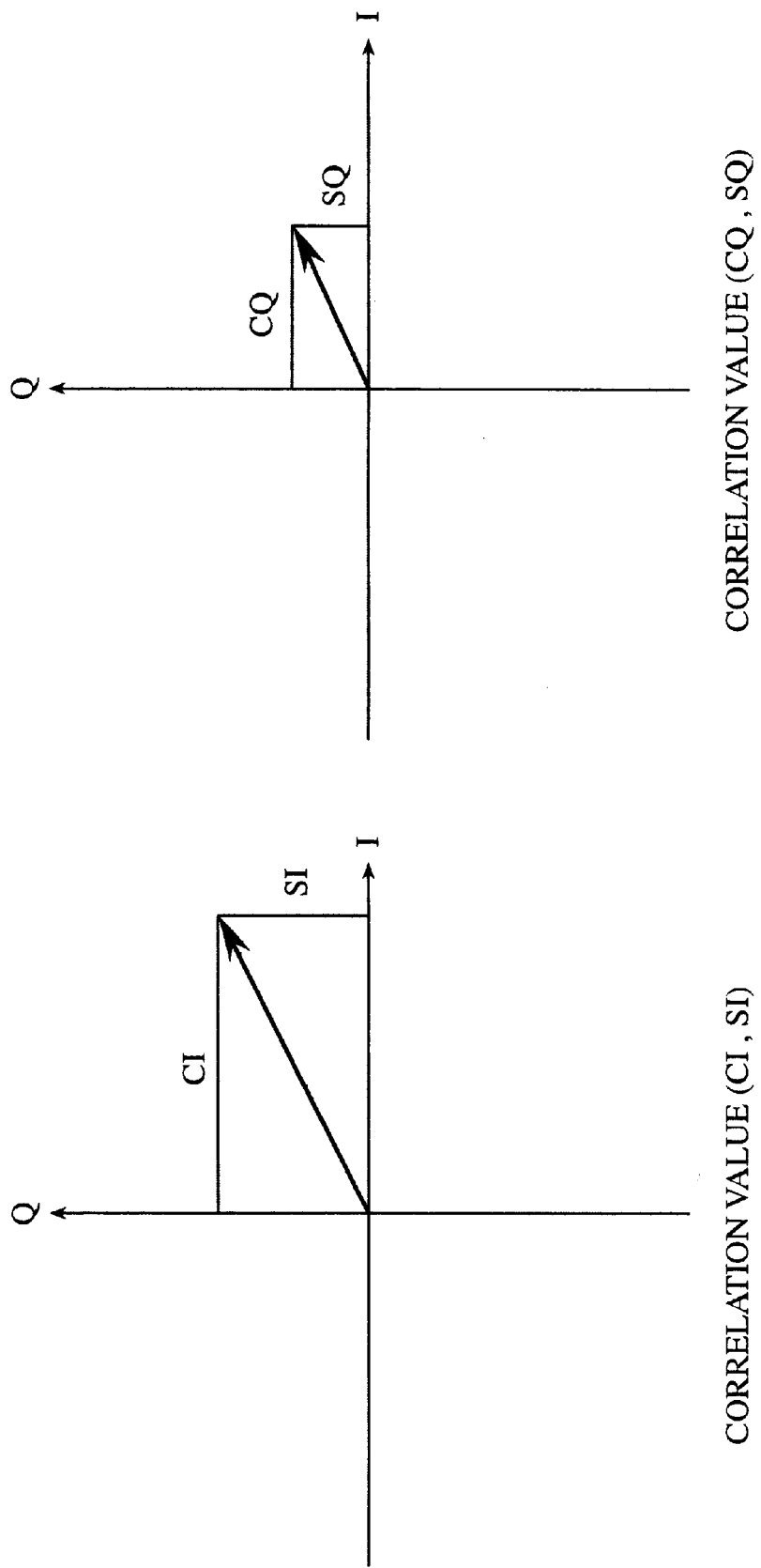
FIG. 32 is a signal space diagram showing an example of the correlation value.
Figure 33:
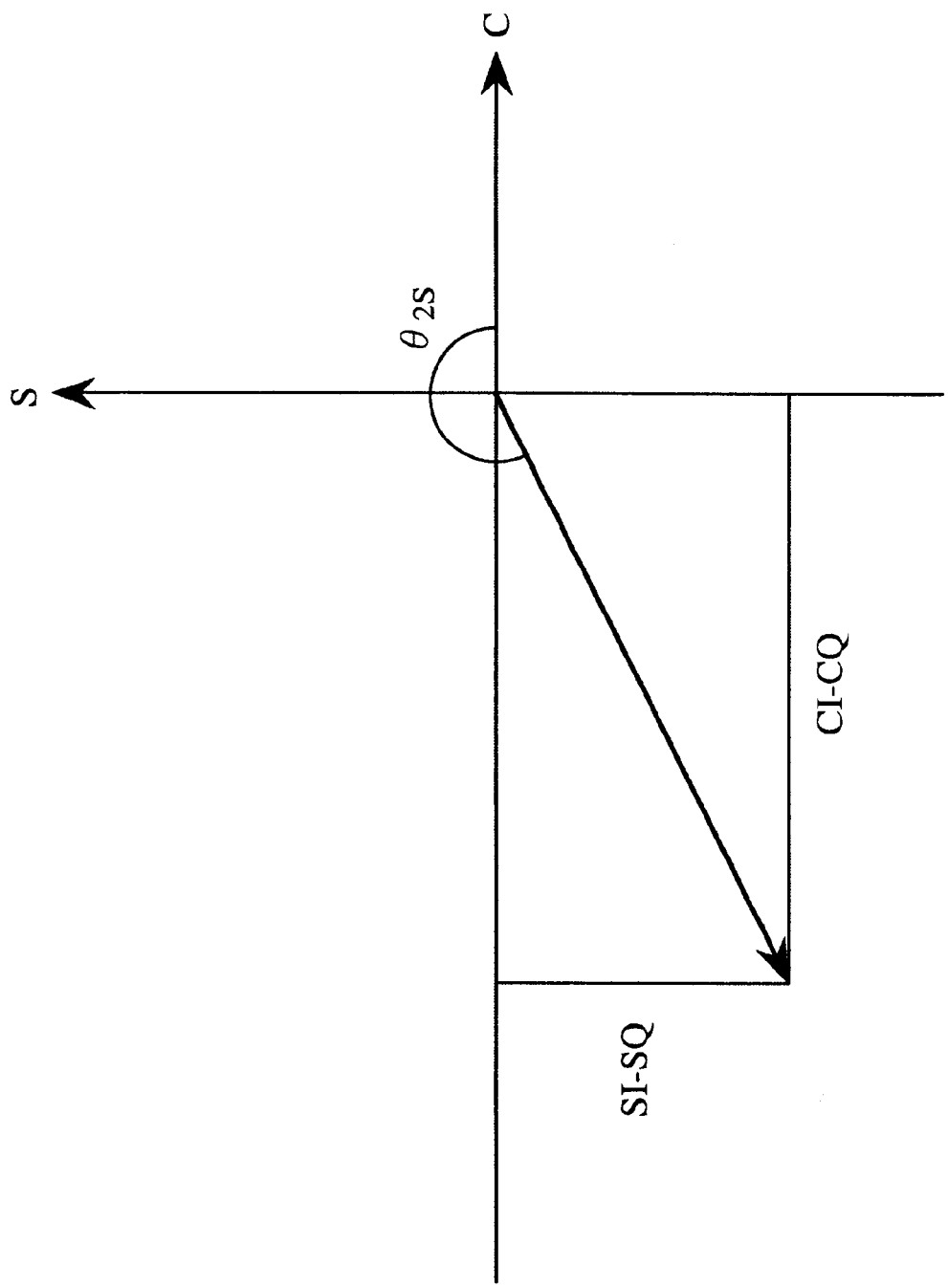
FIG. 33 is a signal space diagram showing an example of the correlation value.
Figure 34:
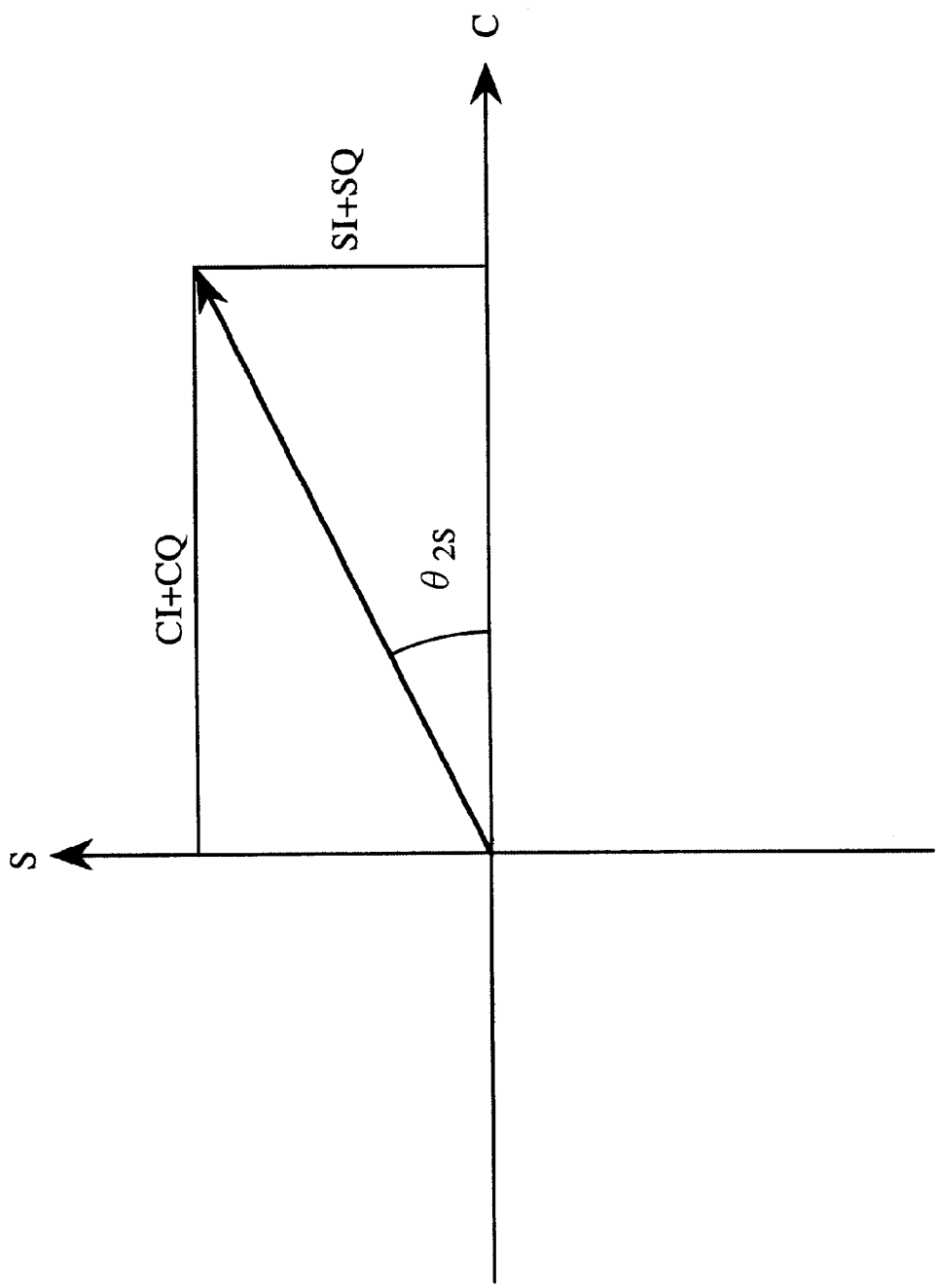
FIG. 34 is a signal space diagram showing an example of the correlation value.

On the other hand, when the carrier phase $\theta c$ is in the range of ($0<\theta c<90$) or ($180<\theta c<270$) as shown in FIG. 29, the in-phase component and quadrature component of the preamble signal are in-phase with each other as depicted in FIGS. 3 and 31; hence, the amplitude of the subtracted signal is reduced by canceling the in-phase and − (quadrature component) of the preamble signal each other as shown in FIG. 8, whereas the amplitude of the added signal is increased by the combining of the in-phase component and quadrature component of the preamble signal as shown in FIG. 7.

As described above, it is apparent that either of the subtracted signal in FIG. 4 and the added signal in FIG. 7 contains a large ½ symbol frequency ($f_s/2=1/(2T)$) component.

Figure 5:
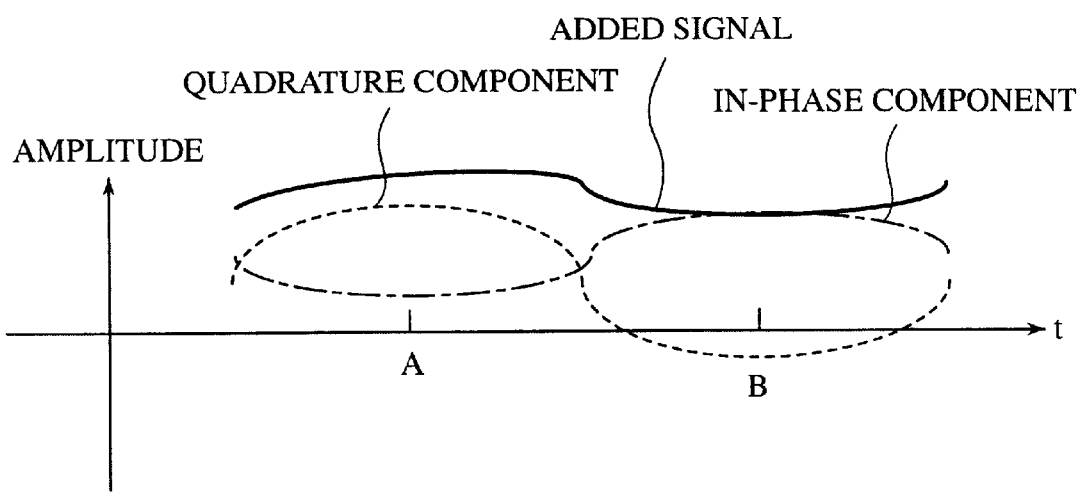
FIG. 5 is a waveform diagram showing an added signal of the preamble.
Figure 6:
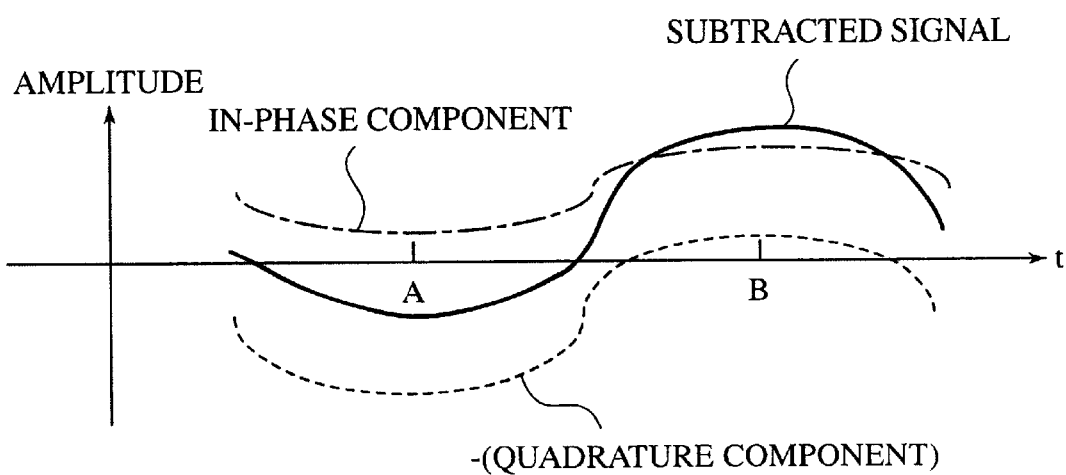
FIG. 6 is a waveform diagram showing a subtracted signal of the preamble.

Similarly, in the case of receiving a preamble signal (for instance, "1101" pattern) that effects an alternate transition between two adjacent Nyquist points in the complex plane upon each occurrence of a symbol, too, the timing recovery device 40 can obtain either one of the added signal and the subtracted signal which has the ½ symbol frequency ($f_s/2=1/(2T)$) component, no matter what value the carrier phase $\theta c$ may have. For example, in the case of receiving the preamble signal having such a carrier phase $\theta c$ as depicted in FIG. 18, the in-phase component and quadrature component of the preamble signal are opposite in phase as shown in FIG. 5, and it can be seen that the subtracted signal shown I FIG. 6 is larger in amplitude than the added signal shown in FIG. 5 and is larger in the ½ symbol frequency ($f_s/2=1/(2T)$) component.

The following description will be given of the operation of the present invention in the case of receiving the preamble signal that performs an alternate transition between two origin-symmetric Nyquist points in the complex plane upon each occurrence of a symbol as shown in FIG. 25, but in the case of receiving the preamble signal that performs an alternate transition between two adjacent Nyquist points in the complex plane upon each occurrence of a symbol, too, the timing recovery scheme of Embodiment 1 permits implementation of the operation described below for the reasons (the ½ symbol frequency ($f_s/2=1/(2T)$) component can be obtained in either one of the added signal and the subtracted signal) given above.

The added value correlation calculating means 42a calculates the correlation of the added signal to the ½ symbol frequency component $\exp[-j\pi(fs)t]$. Concretely, the added value correlation calculating means performs the following multiplications of a data sequence $A_i$ (where $i=1,2,3,\ldots$):

$$Ac_i = A_i \times \cos \pi i/2 \quad (22a)$$

$$As_i = A_i \times \sin \pi i/2 \quad (22b)$$

The added value correlation calculating means averages the above data sequences ($Ac_i$, $As_i$), and outputs added correlation signals ($CA_i$, $SA_i$). Since in the multiplications of Equations (22a) and (22b) $\cos \pi i/2=1, 0, -1, 0, \ldots$ and $\sin \pi i/2=0, 1, 0, -1, \ldots$, the above added value correlation signals ($CA_i$, $SA_i$) can easily be calculated. For instance, in the case of averaging the above-mentioned data sequences over four symbols, the added value correlation signals ($CA_i$, $SA_i$) can be given by the following equations.

$$CA_i=(A_i-A_{i+2}+A_{i+4}-A_{i+6}+A_{i+8}-A_{i+10}+A_{i+12}-A_{i+14})/8 \quad (22c)$$

$$SA_i=(A_{i+1}-A_{i+3}+A_{i+5}-A_{i+7}+A_{i+9}-A_{i+11}+A_{i+13}-A_{i+15})/8 \quad (22d)$$

Likewise, the subtracted value correlation calculating means 42b calculates the correlation of the subtracted signal to the ½ symbol frequency component $\exp[-j\pi(fs)t]$. Concretely, the subtracted value correlation calculating means performs the following multiplications of a data sequence $S_i$ (where i=1,2,3, ... ).

$$Sc_i=S_i \times \cos \pi i/2 \quad (23a)$$

$$Ss_i=S_i \times \sin \pi i/2 \quad (23b)$$

The subtracted value correlation calculating means averages the above data sequences ($Sc_i$, $Ss_i$), and outputs added correlation signals ($CS_i$, $SS_i$). Since in the multiplications of Equations (23a) and (23b) $\cos \pi i/2$=1, 0, −1, 0, ... and $\sin \pi i/2$=0, 1, 0, −1, ..., the above subtracted value correlation signals ($CS_i$, $SS_i$) can easily be calculated. For instance, in the case of averaging the above-mentioned data sequences over four symbols, the subtracted value correlation signals ($CS_i$, $SS_i$) can be given by the following equations.

$$CS_i=(S_i-S_{i+2}+S_{i+4}-S_{i+6}+S_{i+8}-S_{i+10}+S_{i+12}-S_{i+14})/8 \quad (23c)$$

$$SS_i=(S_{i+1}-S_{i+3}+S_{i+5}-S_{i+7}+S_{i+9}-S_{i+11}+S_{i+13}-S_{i+15})/8 \quad (23d)$$

Figure 9:
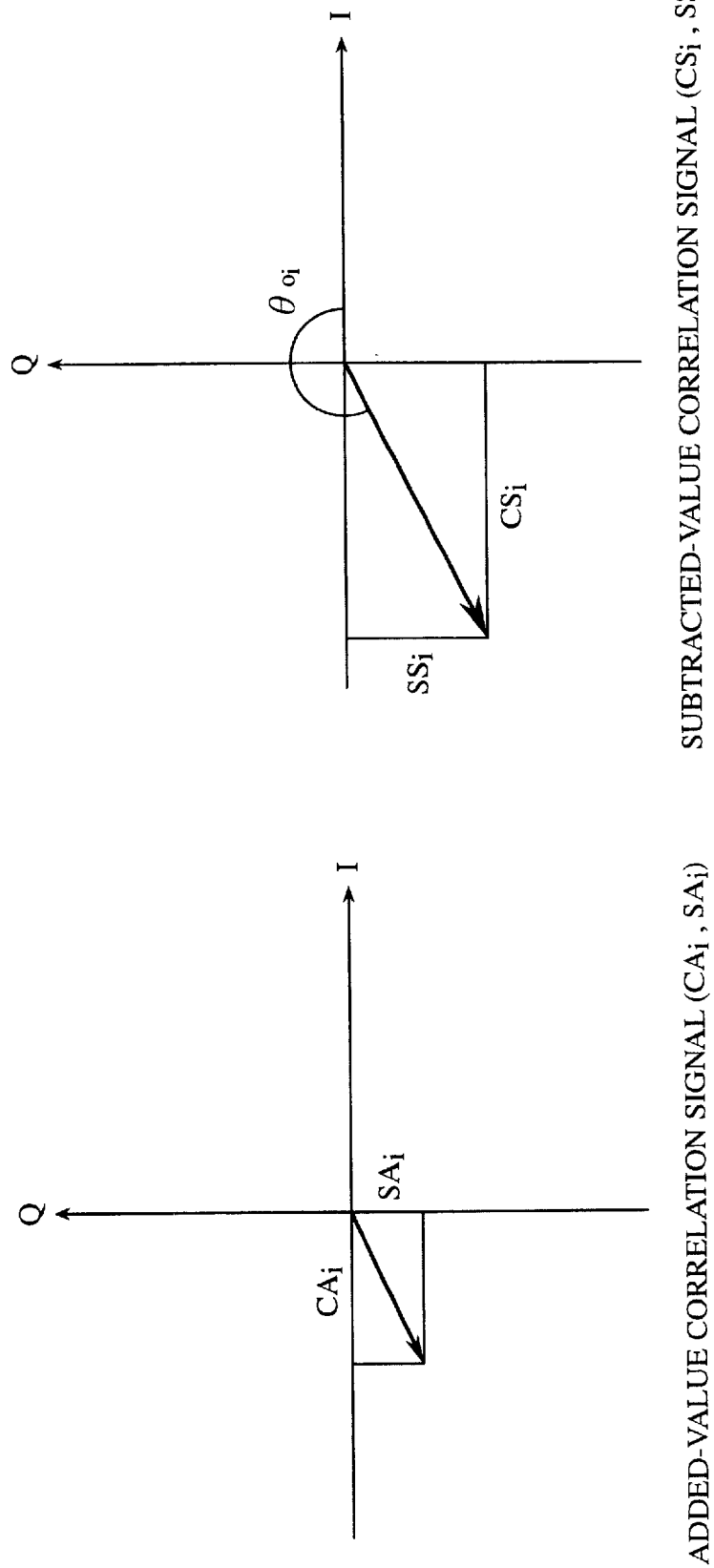
FIG. 9 is a signal space diagram showing an added value correlation signal and a subtracted value correlation signal at the time of receiving a preamble signal.

For example, in the case where the carrier phase $\theta c$ [deg] is in the range of (90<$\theta c$<180) or (270<$\theta c$<360) as shown in FIG. 25 at the time of receiving the preamble signal, since the subtracted signal is larger in amplitude than the added signal, the vector length indicated by the subtracted correlation signals ($CS_i$, $SS_i$) is larger than the vector length indicated by the added value correlation signals ($CA_i$, $SA_i$) as depicted in FIG. 9. FIG. 9 shows the case where data is sampled at the timing shown in FIGS. 3 and 4.

Figure 10:
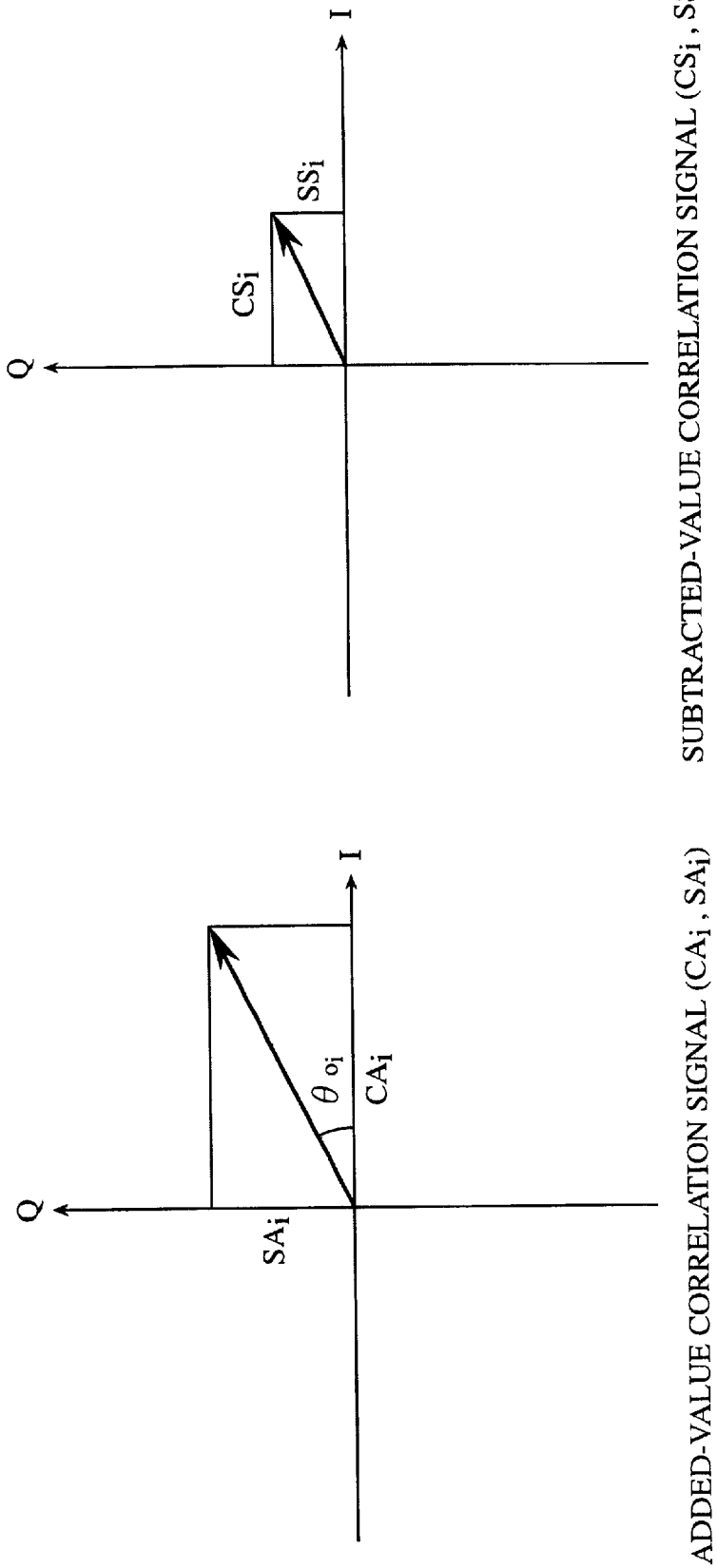
FIG. 10 is a signal space diagram showing an added value correlation signal and a subtracted value correlation signal at the time of receiving a preamble signal.
Figure 15:
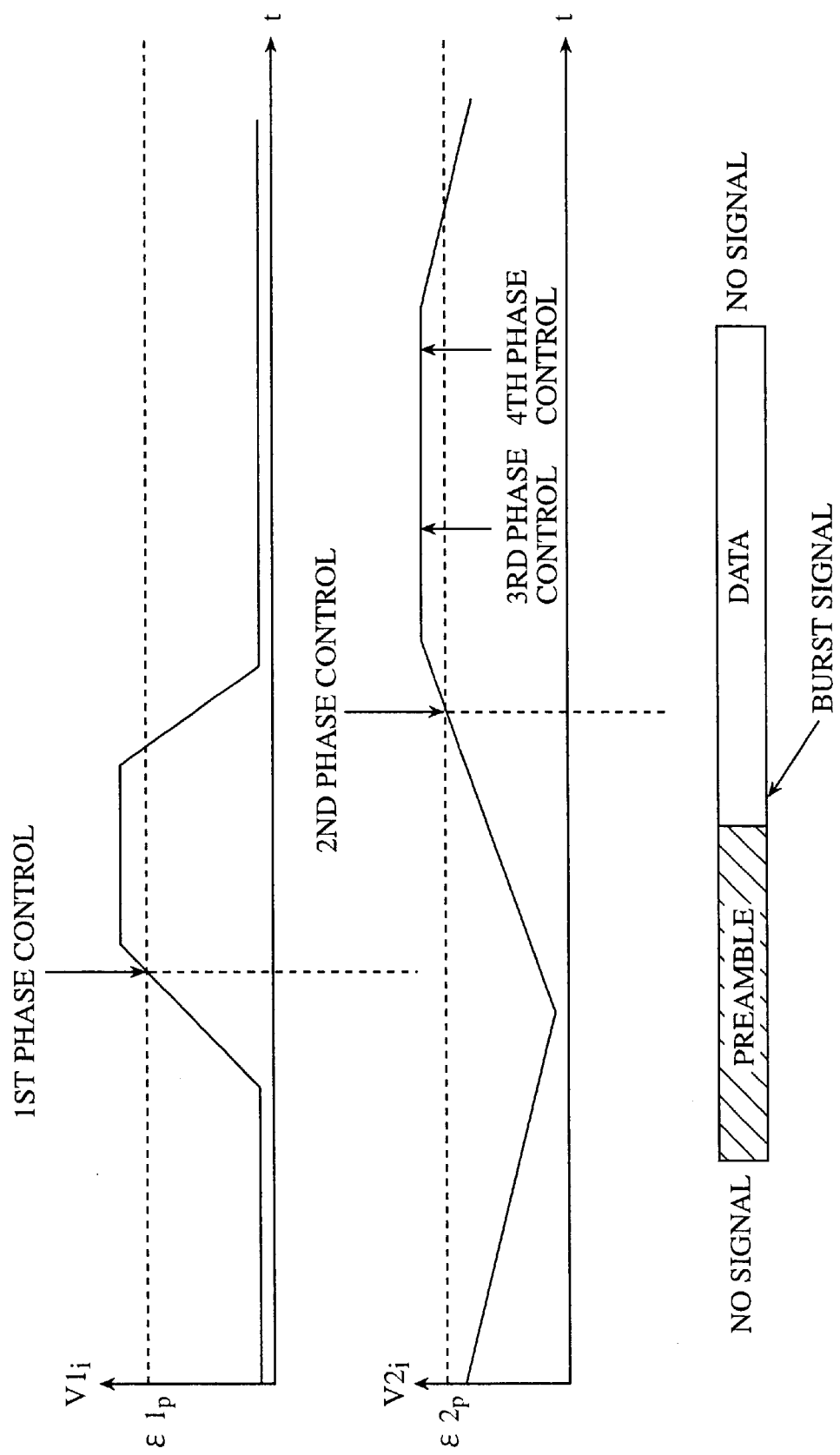
FIG. 15 is a waveform diagram showing the operation of timing phase difference calculating means in Embodiment 4.

On the other hand, for example, when the carrier phase $\theta c$ [deg] is in the range of (0<$\theta c$<90) or (180<$\theta c$<270) as shown in FIG. 15, since the added signal is larger in amplitude than the subtracted signal, the vector length indicated by the added value correlation signals ($CA_i$, $SA_i$) is larger than the vector length indicated by the subtracted value correlation signals ($CS_i$, $SS_i$) as depicted in FIG. 10. FIG. 10 shows the case where data is sampled at the timing shown in FIGS. 7 and 8.

Incidentally, at the time of receiving no signal (at the time of receiving only noise in the absence of signals to be received) or during receiving a significant data portion following the preamble, either of the added value correlation signals ($CA_i$, $SA_i$) and the subtracted value correlation signals ($CS_i$, $SS_i$) indicates a small vector length since the ½ symbol frequency component does not exist for a long time.

The vector selecting means 43 selects that one of the added value correlation signals ($CA_i$, $SA_i$) and the subtracted value correlation signals ($CS_i$, $SS_i$) which indicate the larger vector length, and outputs them as selected correlation signals ($CO_i$, $SO_i$). The operation of the vector selecting means 43 will be described with respect to FIG. 2. The maximum absolute value detecting means 43a performs the same operation as in the case of the conventional vector combining/selecting means 406 to detect the maximum one of absolute values $|CA_i|$, $|SA_i|$, $|CS_i|$ and $|SS_i|$ of the added value correlation signals ($CA_i$, $SA_i$) and the subtracted value correlation signals ($CS_i$, $SS_i$).

The selecting means 43b selects the added value correlation signals ($CA_i$, $SA_i$) when the maximum value detected by the maximum absolute detecting means 43a is either one of $|CA_i|$ and $|SA_i|$, and selects the subtracted value correlation signals ($CS_i$, $SS_i$) when the maximum value is either one of $|CS_i|$ and $|SS_i|$. The selected signals are output as the selected correlation signals ($CO_i$, $SO_i$).

The operation of the vector selecting means 43 at the time of receiving the preamble signal is such as described below. When the carrier phase $\theta c$ [deg] is in the range of (90<$\theta c$<180) or (270<$\theta c$<360) as shown in FIG. 25, the vector length indicated by the subtracted value correlation signals ($CS_i$, $SS_i$) is larger than the vector length indicated by the added value correlation signals ($CA_i$, $SA_i$) as depicted in FIG. 9, and consequently, the vector selecting means 43 selects the subtracted value correlation signals ($CS_i$, $SS_i$), and outputs selected correlation signals ($CO_i$, $SO_i$)=($CS_i$, $SS_i$).

On the other hand, when the carrier phase $\theta c$ [deg] is in the range of (0<$\theta c$<90) or (180<$\theta c$<270) as depicted in FIG. 29, the vector length indicated by the added value correlation signals ($CA_i$, $SA_i$) is larger than the vector length indicated by the subtracted value correlation signals ($CS_i$, $SS_i$) as depicted in FIG. 10, and consequently, the vector selecting means 43 selects the added value correlation signals ($CA_i$, $SA_i$), and outputs selected correlation signals ($CO_i$, $SO_i$)=($CA_i$, $SA_i$).

During receiving no signals (during receiving only noise in the absence of signals to be received) or during receiving the significant data portion following the preamble, either of the added value correlation signals ($CA_i$, $SA_i$) and the subtracted value correlation signals ($CS_i$, $SS_i$) indicates a small vector length, and the vector selecting means performs an operation of randomly selecting either one of the added value correlation signals ($CA_i$, $SA_i$) and the subtracted value correlation signals ($CS_i$, $SS_i$).

Next, the timing phase difference calculating means 44 performs the following two processes at the same time. The one process is to calculate the vector length $V_i$ of the selected correlation signals ($CO_i$, $SO_i$). The vector length $V_i$ may be calculated by Equation (24a), but when it is desirable to reduce the computational complexity, it may also be calculated by equation (24b).

$$V_i=(|CO_i|^2+|SO_i|^2)^{1/2} \quad (24a)$$

$$V_i=\max(|CO_i|, |SO_i|) \quad (24b)$$

Incidentally, when it is desired to reduce absolute value converting processing for obtaining $|CO_i|$ and $|SO_i|$, it is necessary only to selectively use $|CA_i|$, $|SA_i|$, $|CS_i|$ and $|SS_i|$, calculated by the maximum absolute value detecting means 43a, in accordance with the maximum value detected signal.

The other process is to calculate the vector angle $$\theta o_i=\tan^{-1}(SO_i/CO_i) \quad (25)$$

indicated by the selected correlation signals ($CO_i$, $SO_i$). Since $\theta o_i$ is a timing phase difference when normalized by the two-symbol period (2T), as is the case with the aforementioned $\theta_T$, the timing phase $\theta r_i$ [deg] when normalized by the symbol period (T) is given by Equation (26).

$$\theta r_i=2\theta o_i \bmod 360 \quad (26)$$

Figure 30:
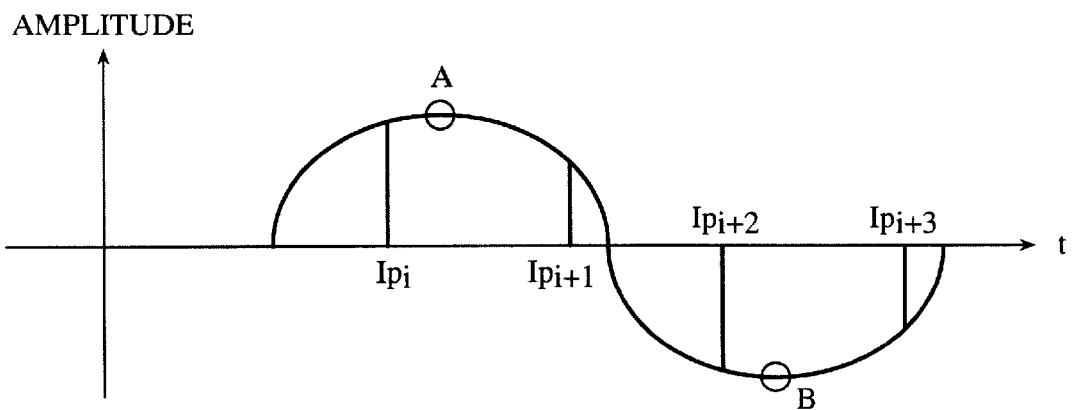
FIG. 30 is a waveform diagram showing an in-phase component of a preamble signal.

While the timing recovery device 40 is receiving the preamble signal, the vector length $V_i$ exhibits a large value, and the timing phase difference $\theta r_i$ [deg] becomes a certain value. For example, when such a preamble signal as shown in FIG. 25 is sampled at the timing shown in FIGS. 26 and 27, the subtracted value correlation signals ($CS_i$, $SS_i$) shown in FIG. 9 are selected by the vector selecting means 43, and the vector length is $V_i$ and the vector angle is $\theta o_i$. On the other hand, when such a preamble signal as shown in FIG. 29 is sampled at the same timing as mentioned above (that is, in the case of FIGS. 30 and 31), the added value correlation signals ($CA_i$, $SA_i$) shown in FIG. 10 are selected by the vector selecting means 43, and the vector length is $V_i$ and the vector angle is $\theta o_i$.

Incidentally, $\theta o_i$ in FIG. 9 and $\theta o_i$ in FIG. 10 differ by 180 [deg], but by the processing of Equation (26), $\theta r_i$ derived from $\theta o_i$ in FIG. 9 and $\theta r_i$ derived from $\theta o_i$ in FIG. 10 match each other.

On the other hand, while the timing recovery device 40 is receiving no signals (receiving only noise in the absence of signals to be received) or receiving the significant data portion following the preamble, the vector length $V_i$ is small and the timing phase difference $\theta r_i$ [deg] also becomes an uncertain value. The certainty relationship between $V_i$ and $\theta r_i$ is shown in FIG. 11.

Thus, even in the case where the timing for receiving the burst signal is unknown and the time of arrival of the preamble is unknown, the timing error $\tau$ can be calculated by the processing described below.

Figure 11:
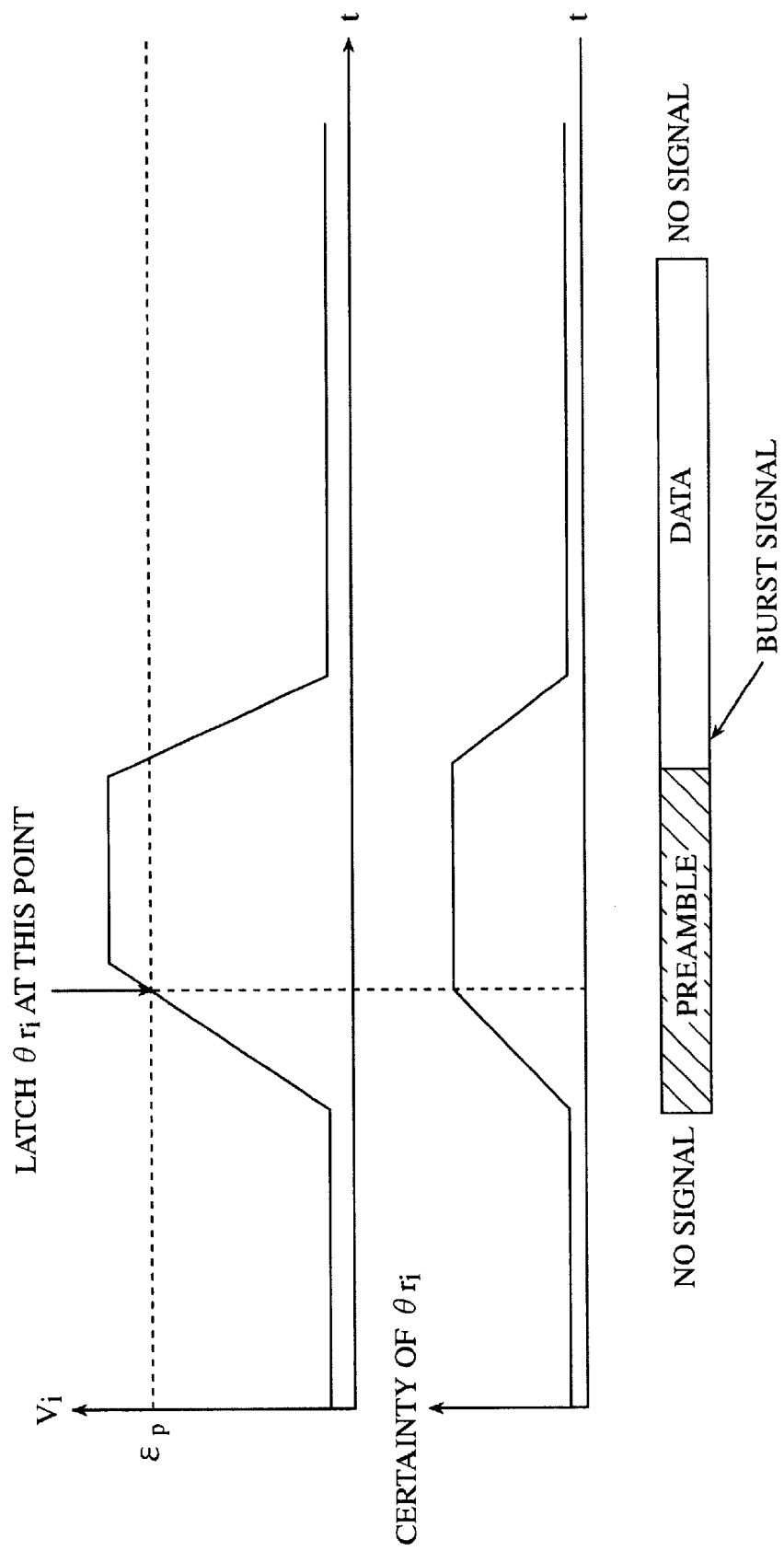
FIG. 11 is a waveform diagram showing the operation of timing phase difference calculating means in Embodiment 1.

That is, the timing phase difference calculating means monitors the vector length $V_i$, and when $V_i$ is large, decides "receiving the preamble signal" and latches the timing phase difference $\theta r_i$ [deg] at the timing shown in FIG. 11. Since the latched timing phase difference $\theta s$ [deg] is, as is evident from FIG. 11, the timing phase difference $\theta r_i$ when $V_i$ is large, and hence it is a certain value. The timing phase difference calculating means 44 calculates the timing error $\tau$ by Equations (5a) and (5b) using the timing phase difference $\theta s$ thus obtained, and supplies the VCO 45 of the following stage with a control signal for canceling the timing error $\tau$.

Incidentally, in the case where the timing for receiving the burst signal is know and the time of arrival of the preamble can be specified, the above-described preamble detecting operation is unnecessary; hence, the timing phase difference calculating means 403a in the prior art example can be used in place of the timing phase difference calculating means 44. In this instance, the function of calculating the vector length $V_i$ and detecting its magnitude is unnecessary—this permits reduction of the scale of circuitry used.

The VCO 45 receives the control signal from the timing phase difference calculating means 44, and controls the phases of the recovered sample clock and the recovered symbol clock to reduce the timing error $\tau$ down to "0".

With its configuration and operations described above, the timing recovery device 40 according to Embodiment 1 produces the effects listed below.

Figure 23:
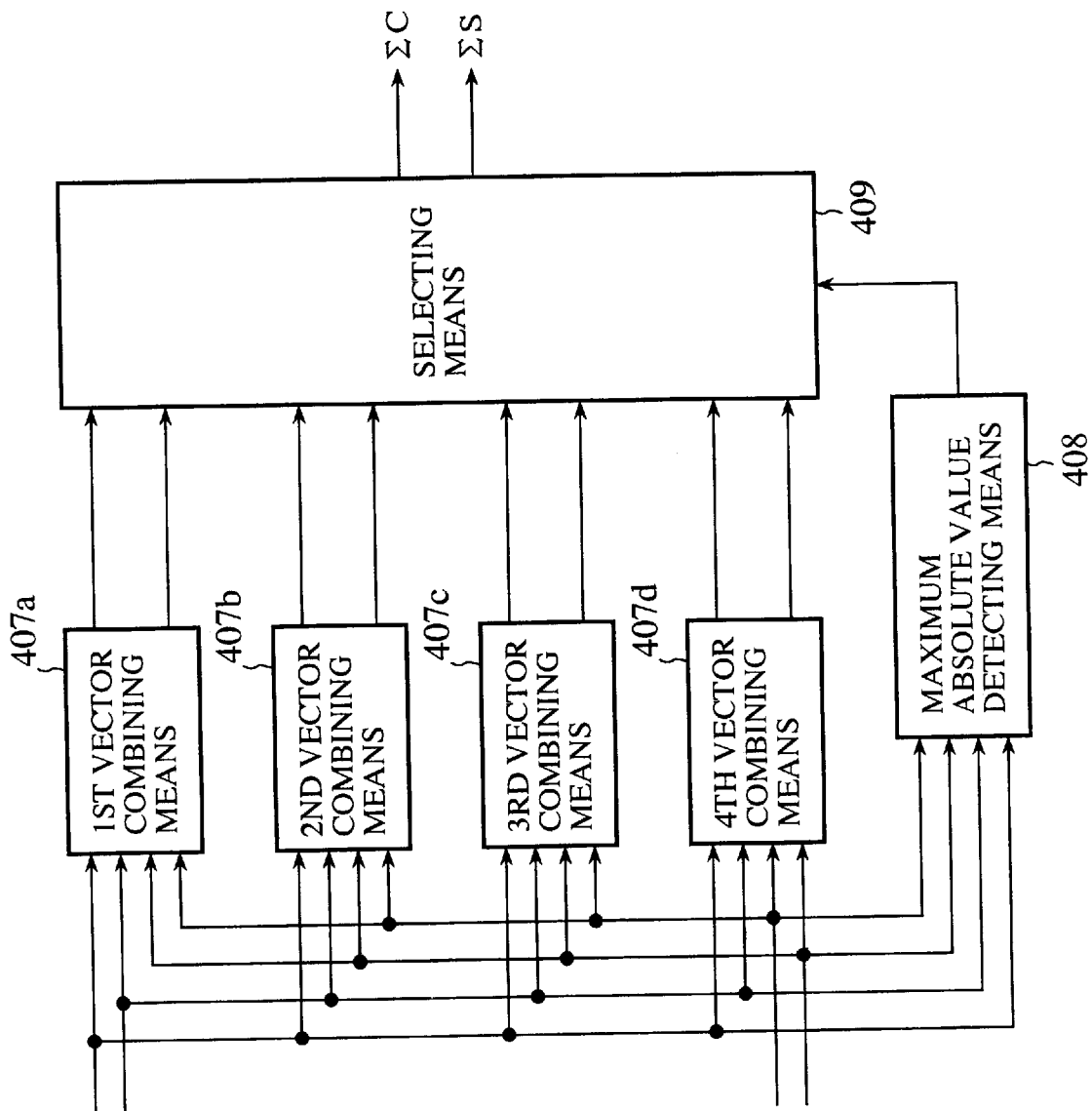
FIG. 23 is a block diagram depicting the configuration of vector combing/selecting means.
Figure 24:
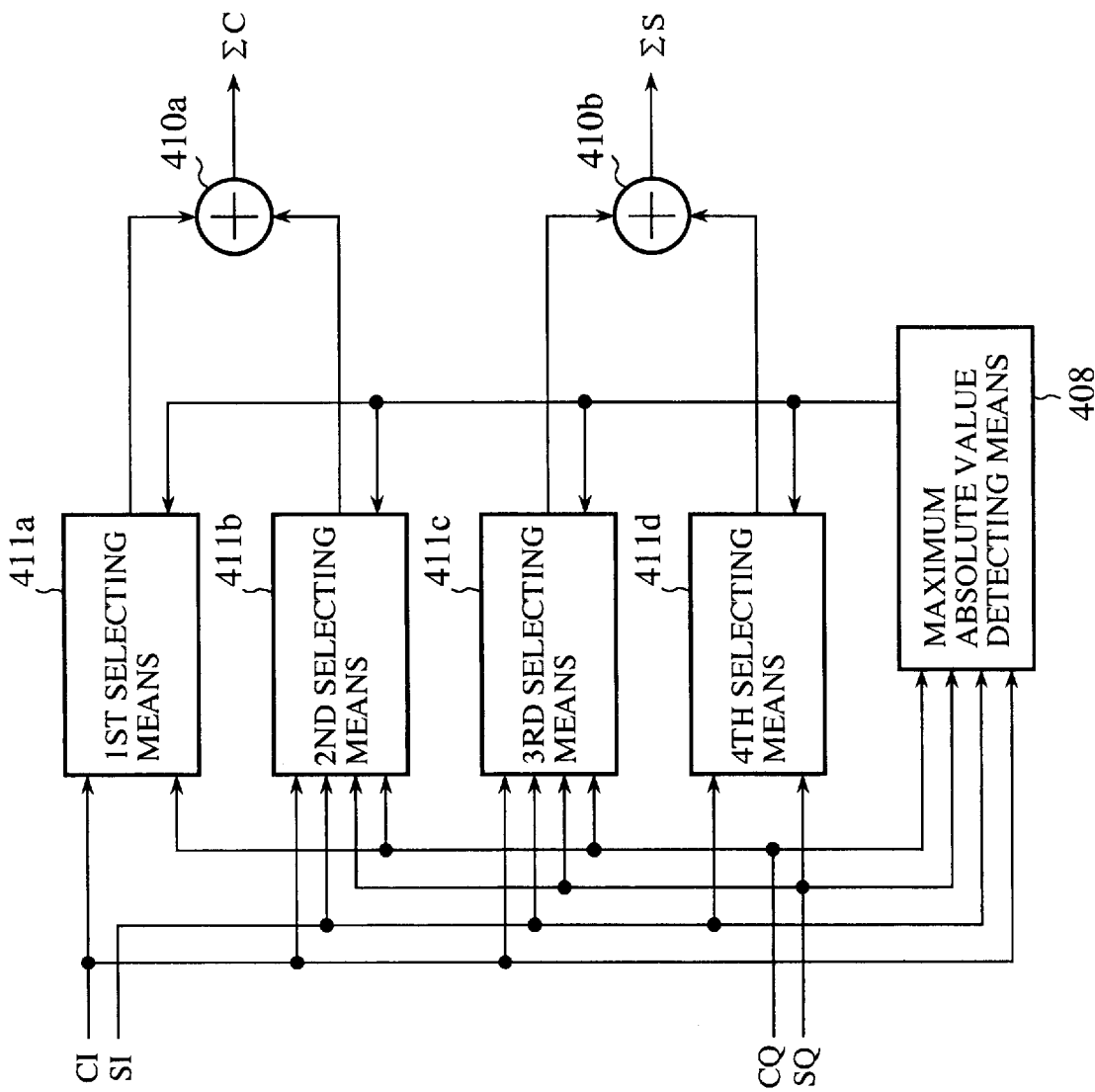
FIG. 24 is a block diagram depicting the configuration of another vector combing/selecting means.

First, since timing the recovery device has a simple construction which performs the correlation calculation for a total of two signals, I.e. the signal having added together the in-phase and quadrature components of the preamble signal and the signal having the two components subtracted from each other and uses, for timing phase estimation, that one of the two resulting correlation values whose vector length is larger than the other, the circuit scale and computational complexity of the timing recovery device of this embodiment can be reduced as compared with the conventional timing recovery devices 400 and 400a. For example, as compared with the timing recovery device 400a, a high precision timing phase estimation can be achieved by the short preamble, as in the case of the timing recovery device 400a, using the simple adding means 41a, subtracting means 41a and vector selecting means 43 (FIG. 2) instead of using the vector combining/selecting means 406 formed by complicated circuits (FIGS. 23 and 24).

Second, the timing recovery device of this embodiment is effective for the signal (for example, "1101" pattern) that effects alternate transition between two adjacent Nyquist points in the complex plane for each symbol and the "$0\pi$" modulated signal (for example, "1001" pattern) that effects an alternate transition between two origin-symmetric Nyquist points n the complex plane for each symbol.

Third, since a high precision timing phase estimation using the preamble and the preamble detection can simultaneously be performed by the timing phase difference detecting means 44, normal timing phase control can be achieved even when the timing for receiving the preamble is unknown.

Fourth, the above-mentioned 1 to 3 can be implemented a low sampling rate of 2 [sample/symbol] as is the case with the prior art example.

Further, the demodulator using the timing recovery device of the present invention realizes high-speed synchronization and high-speed resynchronization with a small-scale circuitry and by a short preamble and achieves an excellent BER (Bit Error Rate) in the significant data portion following the preamble even in the case where the timing for receiving the burst signal is unknown which is generated at turn-on or in reconnection after returning from shadowing.

Incidentally, the timing recovery device 45b of Embodiment 1 is applicable to systems using any modulation schemes (BPSK, QPSK, $\pi/4$QPSK, OQPSK, FSK, and so on) as long as they are radio communication systems using the preamble signal that effects an alternate transition between two points in the complex plane for each symbol as well as the following two preamble signals ((1) the preamble signal that effects an alternate transition between two origin-symmetric Nyquist points in the complex plane for each symbol, and (2) the preamble signal that effects an alternate transition between two adjacent Nyquist points in the complex plane for each symbol).

Embodiment 2

Figure 12:
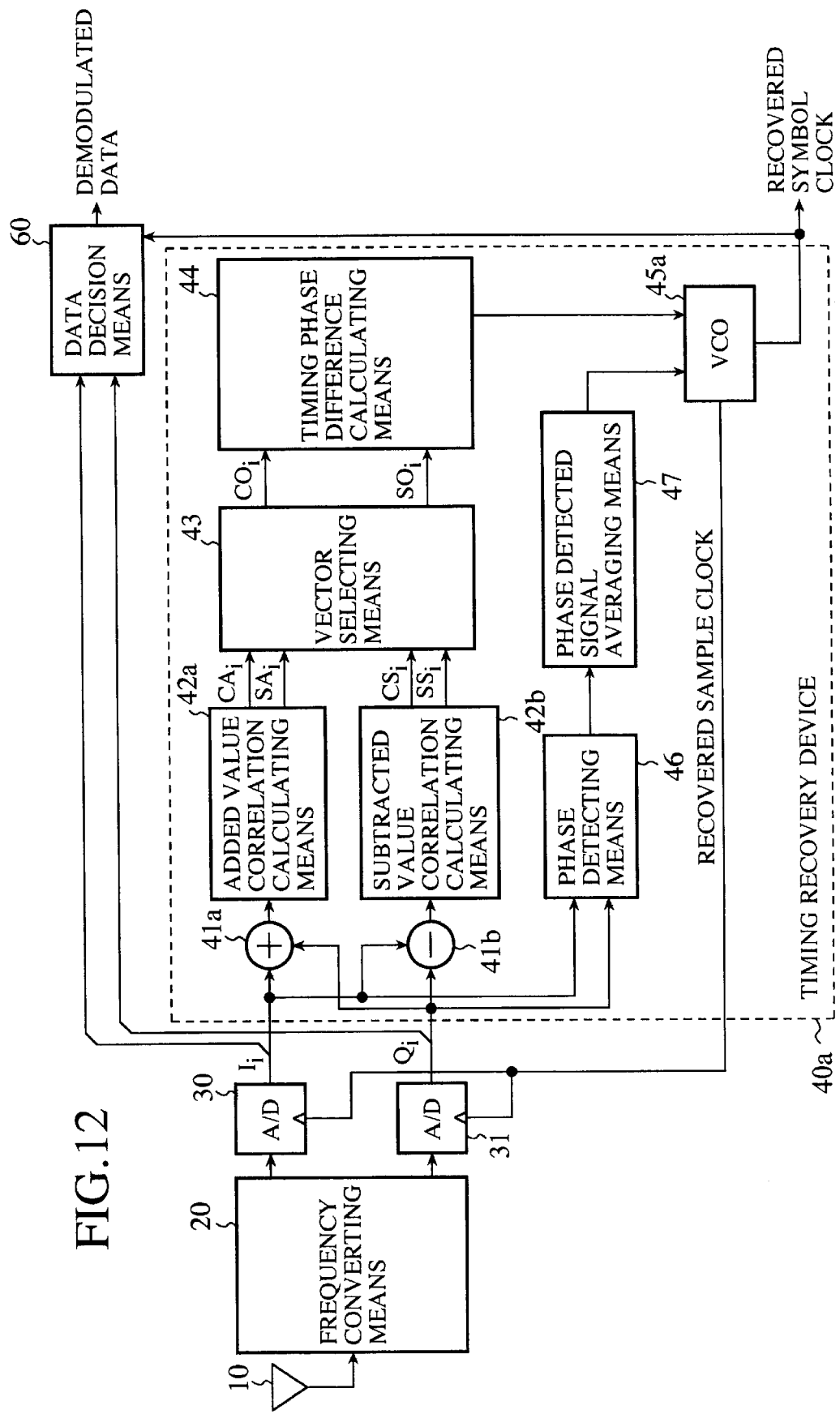
FIG. 12 is a block diagram illustrating the configuration of a demodulator according to Embodiment 2.

FIG. 12 is a block diagram illustrating the configuration of a demodulator according to Embodiment 2. In FIG. 12, reference numeral 10 denotes an antenna for receiving a radio signal; 20 denotes frequency converting means for frequency converting the radio signal received by the antenna 10 to a base band signal; 30 and 31 denote A/D converters each for sampling the base band signal frequency converted by the frequency converting means 20 at a rate twice higher than a symbol rate for conversion to a digital base band signal; 40a denotes a timing recovery device for performing timing synchronization, using the digital base band signals converted by the A/D converting means 30 and 31; and 60 denotes data decision means which extracts Nyquist point data from the digital base band signals through the use of a recovered symbol clock output from the timing recovery device 40 and makes a decision on the extracted Nyquist point data.

In the timing recovery device 40a, reference numeral 41a denotes adding means for adding together an in-phase component of the base band signal and a quadrature component of the base band signal; 41b denotes subtracting means for subtracting the in-phase component of the base band signal and the quadrature component of the base band signal from each other; 42a denotes added value correlation calculating means for calculating the correlation between the added signal and a ½ symbol frequency component; 42b denotes subtracted value correlation calculating means for calculating the correlation between the subtracted signal and the ½ symbol frequency component; and 43 denotes vector selecting means which compares the magnitude of the added value correlation signal and the magnitude of the subtracted value correlation signal and selects the correlation signal of the larger magnitude.

Further, reference numeral 44 denotes timing phase difference calculating means for calculating a timing phase difference, using the vector angle indicated by the selected correlation signal; 45a denotes a VCO (recovered sample clock oscillating means) which controls the phases of a recovered sample clock and the recovered symbol clock to reduce a timing error down to "0"; 46 denotes phase detecting means for detecting the timing phase, using the base band signal sampled by the recovered sample clock; and 47 denotes phase detected signal averaging means for averaging phase detected signals and for outputting the average as a phase lead/lag signal.

The operation of Embodiment 2 will be described below.

Embodiment 2 uses, in combination, such a conventional PLL timing recovery device as disclosed, for example, in literature "A Study of QPSK Timing Recovery Scheme Using Received Signal Phase Information" (written by Fujimura, Journal of the Society of Electronics, Information and Communication Engineers of Japan, VOL.J81-B-no.6, pp.665–668, June 1998), and operates a PLL timing recovery device composed of the phase detecting means 46, the phase detected signal averaging means 47 and the VCO 45a even during the preamble detection and the timing error τ calculation by Embodiment 1.

The processing of the adding means 41a and the subtracting means 41b to the timing phase difference calculating means 44 are the same as in Embodiment 1, and upon detecting the preamble signal, a clock phase control signal for canceling the timing error τ, calculated at the same time as the detection of the preamble signal, is provided as a first phase control signal to the VCO 45a.

Meanwhile, the phase detecting means 46 detects whether the timing phase is leads or lags behind the received data ($I_i$, $Q_i$) based on, for instance, the scheme disclosed in the above-mentioned literature, and outputs a detected "+1" if the timing phase leads the received data and "−1" if the timing phase lags behind it.

The phase detected signal averaging means 47 averages such lead/lag signals, for example, by a random walk filter, and outputs the average as a second phase control signal. The VCO 45a controls the phases of the recovered sample clock and the recovered symbol clock by the second phase control signal, causing the timing phase to lead or lag, depending on whether the second phase control signal is "positive" or "negative". The VCO 45a is usually controlled by the second phase control signal, but when the preamble is detected and the first phase control signal is input thereto, it controls the phases of the respective clocks, using the first phase control signal instead of using the second phase control signal.

A disadvantage of using only the second phase control signal is a large amount of time needed to pull in the timing phase, because the lead/lag control of the timing phase by the second phase control signal is effected, for instance, in steps of 1/16 symbol. On the contrary, an advantage of this scheme is to enable the timing phase to be followed during receiving the significant data portion following the preamble signal.

On the other hand, a disadvantage of using only the first phase control lies in that during receiving the significant data portion following the preamble signal the timing phase difference $\theta r_i$ [deg] becomes uncertain and cannot be used. On the contrary, an advantage of using the first phase control signal alone is to permit high precision detection of the timing phase difference by a short preamble signal as described previously in respect of Embodiment 1.

Since Embodiment 2 uses both of the first phase control signal and the second phase control signal, the above-mentioned two advantages compensate for the above-mentioned two disadvantages, producing the following effect in addition to those obtainable with Embodiment 1.

That is, this embodiment estimates and controls the timing phase with high accuracy by a short preamble signal and, at the same time, enables the timing phase to be followed even during reception of a significant random data portion.

Incidentally, as is the case with Embodiment 1, the timing recovery device 45c of Embodiment 2 is applicable to systems using any modulation schemes (BPSK, QPSK, π/4QPSK, OQPSK, FSK, and so on) as long as they are radio communication systems using the preamble signal that effects an alternate transition between two points in the complex plane for each symbol as well as the following two preamble signals ((1) the preamble signal that effects an alternate transition between two origin-symmetric Nyquist points in the complex plane for each symbol, and (2) the preamble signal that effects an alternate transition between two adjacent Nyquist points in the complex plane for each symbol).

Embodiment 3

Figure 13:
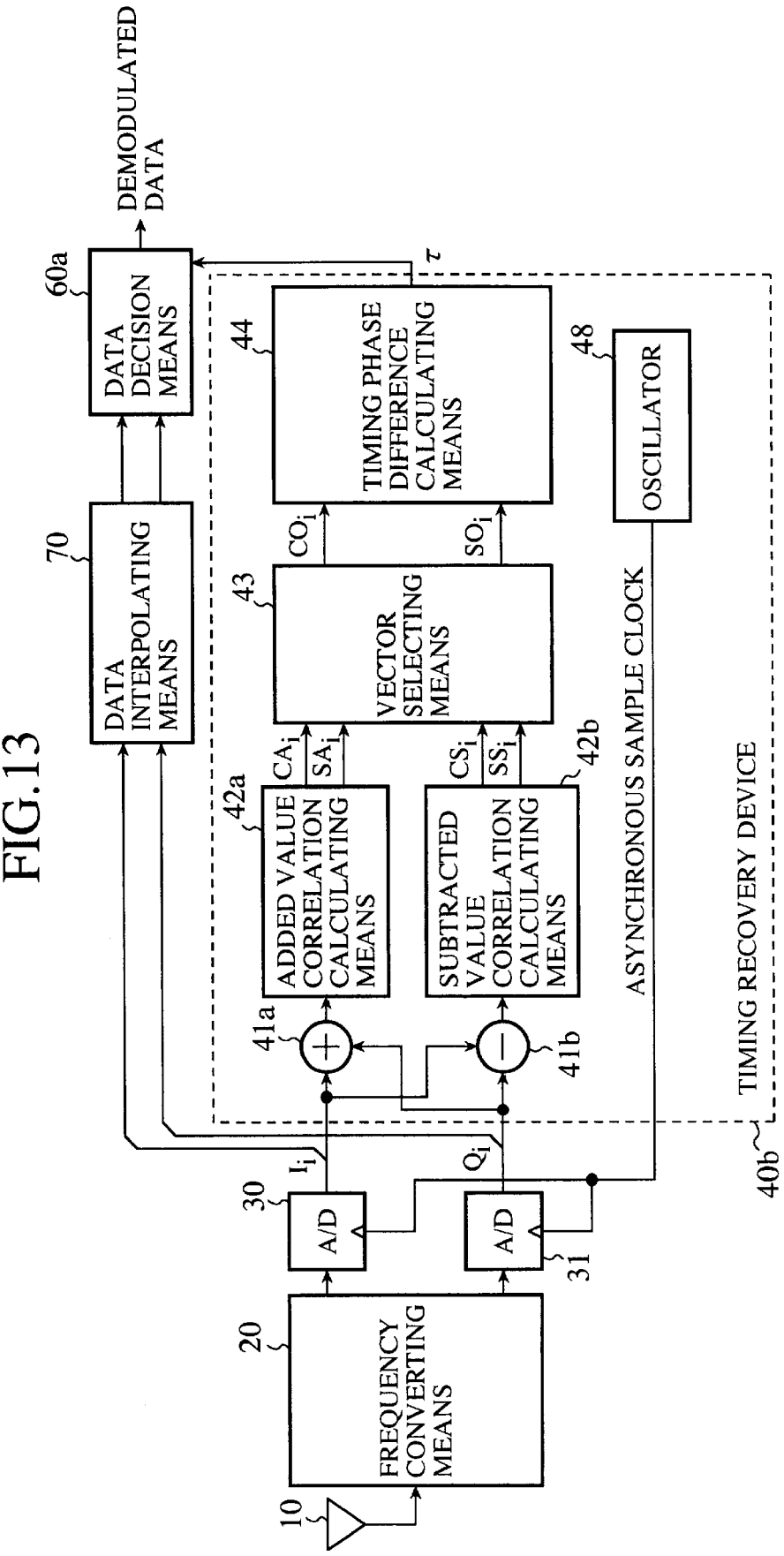
FIG. 13 is a block diagram illustrating the configuration of a demodulator according to Embodiment 3.

FIG. 13 is a block diagram illustrating the configuration of a demodulator according to Embodiment 3. In FIG. 13, reference numeral 10 denotes an antenna for receiving a radio signal; 20 denotes frequency converting means for frequency converting the radio signal received by the antenna 10 to a base band signal; 30 and 31 denote A/D converters each for sampling the base band signal frequency converted by the frequency converting means 20 at a rate twice higher than a symbol rate for conversion to a digital base band signal; 40b denotes a timing recovery device for performing timing synchronization, using the digital base band signals converted by the A/D converting means 30 and 31; 70 denotes data interpolating means for interpolating the digital base band signals sampled by an asynchronous sample clock output from the timing recovery device 40b; and 60a denotes data decision means which extracts Nyquist point data of the interpolated base band signals output from the data interpolating means and makes a decision on the extracted Nyquist point data.

In the timing recovery device 40b, reference numeral 41a denotes adding means for adding together an in-phase component of the base band signal and a quadrature component of the base band signal; 41b denotes subtracting means for subtracting the in-phase component of the base band signal and the quadrature component of the base band signal from each other; 42a denotes added value correlation calculating means for calculating the correlation between the added signal and a ½ symbol frequency component; 42b denotes subtracted value correlation calculating means for calculating the correlation between the subtracted signal and the ½ symbol frequency component; 43 denotes vector selecting means which compares the magnitude of the added value correlation signal and the magnitude of the subtracted value correlation signal and selects the correlation signal of the larger magnitude; 44 denotes timing phase difference calculating means for calculating a timing phase difference, using the vector angle indicated by the selected correlation signal; 48 denotes an oscillator (asynchronous sample clock oscillating means) which outputs an asynchronous sample clock and an asynchronous ½ symbol frequency component.

The operation of Embodiment 3 will be described below.

While Embodiment 1 has been described to use the feedback type timing recovery device 40 which reduces the timing error τ down to "0" through phase control of the recovered sample clock and the recovered symbol clock by the VCO 45, Embodiment 1 can be modified to use such a feedforward type timing recovery device as indicated by the timing recovery device 40b in Embodiment 3. That is, the VCO 45 is replaced with the oscillator 48, then the data interpolating means 70 is added, and the processing of the data decision means 60 is switched to processing of the data decision means 60a.

The oscillator 48 outputs a free-running asynchronous sample clock of a period twice higher than the symbol period. The A/D converters 30 and 31 sample data by the asynchronous sample clock at a rate of 2 [sample/symbol]. The adding means 41a and the subtracting means 41b perform the addition and subtraction of the asynchronously sampled received data ($I_i$, $Q_i$) as in Embodiment 1. The added value correlation calculating means 42a calculates the correlation between the added signal output from the adding means 41a and the ½ symbol frequency component exp[−jπ(fs)t] output from the oscillator in the same manner as in Embodiment 1.

The subtracted value correlation calculating means 42b calculates the correlation between the subtracted signal output from the subtracting means 41b and the ½ symbol frequency component exp[−jπ(fs)t] output from the oscillator in the same manner as in Embodiment 1. The vector selecting means 43 and the timing phase difference calculating means 44 perform the same processing as in Embodiment 1 to calculate the timing errorτ.

The data interpolating means 70 interpolates the received data ($I_i$, $Q_i$) obtained by asynchronous sampling at the rate of 2 [sample/symbol] to generate received data having time resolution 1/16 the symbol period, for instance, and outputs interpolated received data. The data decision means 60a uses the timing error τ information from the timing phase difference calculating means 44 to extract a Nyquist point of the interpolated received data, and outputs data of the extracted Nyquist point as demodulated data.

The feedforward type configuration of the timing recovery device of Embodiment 3 described above produces the following effect in addition to those obtainable with Embodiment 1.

That is, the use of the low-cost and small-sized oscillator 48 permits further reduction of the cost and downsizing of the timing recovery device 40b.

Incidentally, as is the case with Embodiment 1, the timing recovery device 45d of Embodiment 3 is applicable to systems using any modulation schemes (BPSK, QPSK, π/4QPSK, OQPSK, FSK, and so on) as long as they are radio communication systems using the preamble signal that effects an alternate transition between two points in the complex plane for each symbol as well as the following two preamble signals ((1) the preamble signal that effects an alternate transition between two origin-symmetric Nyquist points in the complex plane for each symbol, and (2) the preamble signal that effects an alternate transition between two adjacent Nyquist points in the complex plane for each symbol).

Embodiment 4

Figure 14:
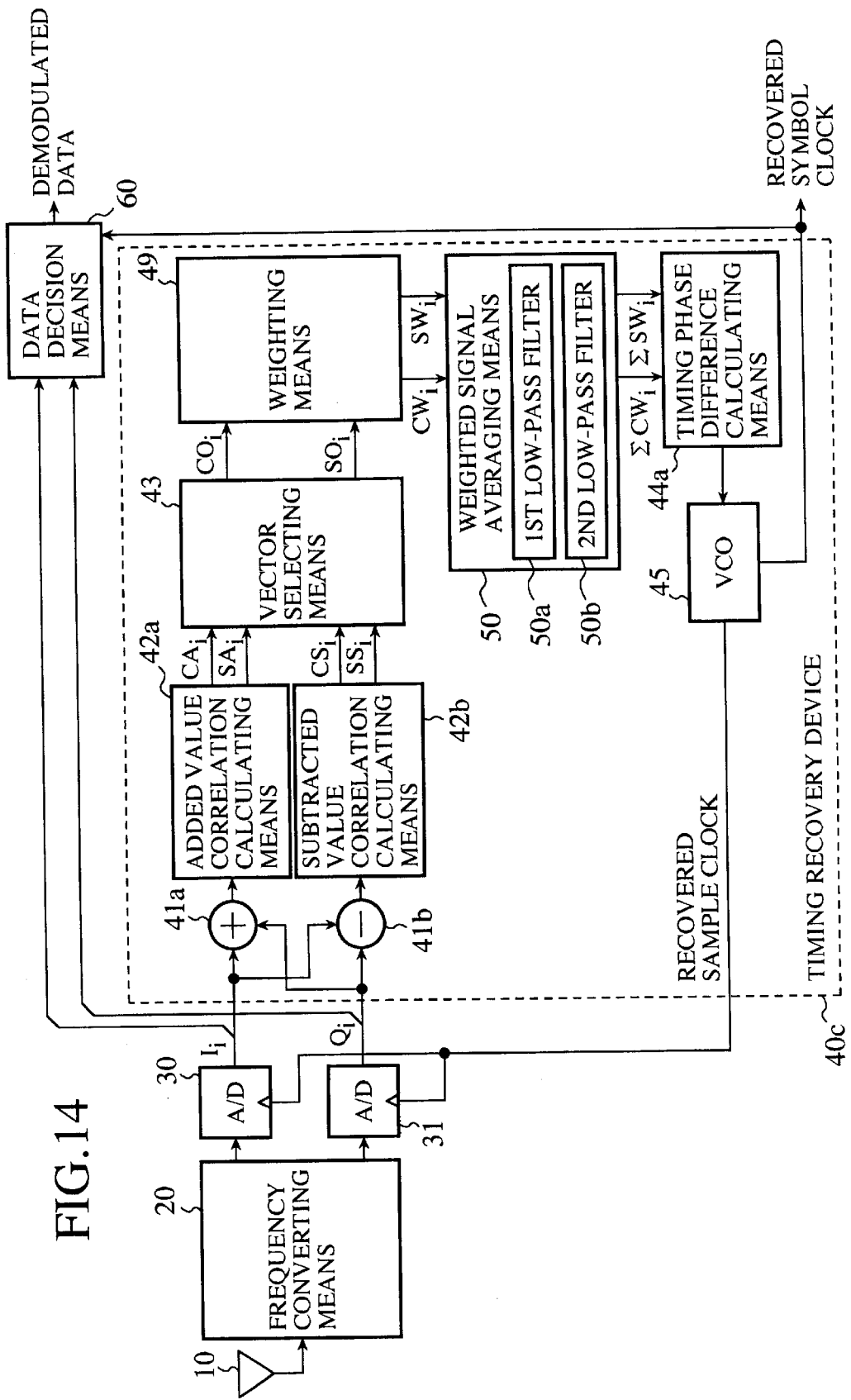
FIG. 14 is a block diagram illustrating the configuration of a demodulator according to Embodiment 4.

FIG. 14 is a block diagram illustrating the configuration of a demodulator according to Embodiment 4. In FIG. 14, reference numeral 10 denotes an antenna for receiving a radio signal; 20 denotes frequency converting means for frequency converting the radio signal received by the antenna 10 to a base band signal; 30 and 31 denote A/D converters each for sampling the base band signal frequency converted by the frequency converting means 20 at a rate twice higher than a symbol rate for conversion to a digital base band signal; 40c denotes a timing recovery device for performing timing synchronization, using the digital base band signals converted by the A/D converting means 30 and 31; and 60 denotes data decision means which extracts Nyquist point data from the digital base band signals and makes a decision on the extracted Nyquist point data.

In the timing recovery device 40b, reference numeral 41a denotes adding means for adding together an in-phase component of the base band signal and a quadrature component of the base band signal; 41b denotes subtracting means for subtracting the in-phase component of the base band signal and the quadrature component of the base band signal from each other; 42a denotes added value correlation calculating means for calculating the correlation between the added signal and a ½ symbol frequency component; 42b denotes subtracted value correlation calculating means for calculating the correlation between the subtracted signal and the ½ symbol frequency component; and 43 denotes vector selecting means which compares the magnitude of the added value correlation signal and the magnitude of the subtracted value correlation signal and selects the correlation signal of the larger magnitude.

Further, reference numeral 44a denotes timing, phase difference calculating means for calculating a timing phase difference, using the vector angle indicated by averaged correlation signals; 45 denotes a VCO (recovered sample clock oscillating means) which controls the phases of the recovered sample clock and a recovered symbol clock; 49 denotes weighting means for weighting the selected correlation signals according to the vector length indicated by the selected correlation signals; 50 denotes weighted signal averaging means for averaging the weighted correlation signals; 50a denotes a first low-pass filter of a small time constant which is supplied with the weighted correlation signals; and 50b denotes a second low-pass filter of a large time constant which is supplied with the weighted correlation signals.

The operation of Embodiment 4 will be described below. Embodiment 4 performs timing recovery through the use of not only the preamble signal but also a random pattern signal following the preamble, and realizes timing synchronization even during receiving the random pattern signal, by a scheme different from that of Embodiment 2. Basically, this embodiment extracts not only the preamble signal but also ½ symbol frequency components present burst-wise at time intervals of several symbols in the random pattern signal following the preamble, and averages them for use in estimating the timing phase.

As described previously, the timing recovery device of each of Embodiments 1 to 3 are effective for the following two preamble signals ((1) the preamble signal that effects an alternate transition between two origin-symmetric Nyquist points in the complex plane for each symbol, and (2) the preamble signal that effects an alternate transition between two adjacent Nyquist points in the complex plane for each symbol); the transition of such a signal having the ½ symbol frequency component is also present during the reception of the random pattern though it is as short as several symbols.

For example, in the case of the QPSK modulation system the ½ symbol frequency component is present in 8-bit data sequences of a total of 12 patterns listed below. The probability of occurrence of any one of them is as low as 12/256=4.6%, but by detecting the ½ symbol frequency components contained in these patterns and averaging them over a long period of time, high precision timing phase estimation can be achieved even during receiving the random pattern.

Pattern A: 11001100
Pattern B: 00110011
Pattern C: 01100110
Pattern D: 10011001
Pattern E: 11011101
Pattern F: 01110111
Pattern G: 11101110
Pattern H: 10111011
Pattern I: 01000100
Pattern J: 00010001
Pattern K: 10001000
Pattern L: 10001000

In Embodiment 4 of FIG. 14, the operations of the antenna 10 to the vector selecting means are the same as in Embodiment 1 except one point. This difference is to use a small number of pieces of data, about {4, 8, 12}, in averaging the data sequences after multiplication by the added value correlation calculating means 42a and the subtracted value correlation calculating means 42b. For example, in the case of calculating the correlation to any one of the 8-bit patterns A to L, the number of pieces of data for averaging is eight consecutive pieces of data.

The weighting means 49 calculates the vector length $VO_i$ of the selected correlation signals ($CO_i$, $SO_i$), then multiplies ($CO_i$, $SO_i$) by a weighting value $\alpha$ corresponding to the magnitude of $VO_i$, and outputs the multiplied results as weighted correlation signals ($CW_i$, $SW_i$).

$$CW_i = \alpha CO_i \tag{27a}$$

$$SW_i = \alpha CO_i \tag{27b}$$

In this instance, the vector length $VO_i$ takes a very large value in the case of receiving the above patterns A to D. It takes a large value in the case of receiving the above patterns E to L. In the case of receiving other patterns, it takes a small value.

Hence, the weighting means 49 can extract only the correlation information during the reception of the above patterns A to L by performing the weighting based on the vector length $VO_i$ as indicated by Equations (27a) and (27b). For example, in the case where $VO_i$ is detected as three-valued using two threshold values and $VO_i$ has a very large value, set $\alpha=1$. When $VO_i$ has a large value, set $\alpha=\frac{1}{2}$. Further, when $VO_i$ has a small value, set $\alpha=0$.

With such setting, the selected correlation signals ($CO_i$, $SO_i$) having uncertain timing phase information except the above patterns A to L will not be output to the subsequent stage. Of the patterns A to L, the patterns A to D contains many ½ symbol frequency components likely to have timing phase information more certain than that of the patterns E to L; since heavy weighting is carried out during receiving them, the ½ symbol frequency components effective in the timing phase estimation are extracted efficiently.

The weighted signal averaging means 50 averages the weighted correlation signals ($CW_i$, $SW_i$), and outputs the average values as averaged weighted correlation signals ($\Sigma CW_i$, $\Sigma SW_i$). Since the weighted signal averaging means 50 is supplied with heavily weighted (for example, multiplied by "1") correlation signals ($CW_i$, $SW_i$) during the reception of the preamble, accurate timing phase difference information can be obtained with a small number of pieces of data. During receiving the preamble, it is necessary to quickly cancel timing information on the burst signal previously received and quickly acquire the timing information on the burst signal being currently received. Hence, during receiving the preamble signal it is necessary to perform the averaging with a small number of pieces of data.

On the other hand, during receiving significant random data, since the weighted signal averaging means 50 is supplied with many lightly weighted (for example, multiplied by "0") correlation signals ($CW_i$, $SW_i$), it is necessary for obtaining accurate timing information to perform averaging using a large number of pieces of data corresponding to tens to hundreds of symbols.

To this end, the weighted signal averaging means 50 is provided with the first low-pass filter 50a of a small time constant for the preamble signal and the second low-pass filter 50b of a large time constant for significant random data, and outputs output information ($\Sigma 1CW_i$, $\Sigma 1SW_i$) and ($\Sigma 2CW_i$, $\Sigma 2SW_i$) from the both filters. For example, in the case of using two IIR (Infinite Impulse Response) filters that bear a relationship of $\beta < \gamma$ (where $0<\beta<1$ and $0<\gamma<1$), the first IIR (Infinite Impulse Response) filter performs the following processing.

$$\Sigma 1 CW_i = \beta \Sigma CW_{i-1} + CW_i \tag{28a}$$

$$\Sigma 1 SW_i = \beta \Sigma SW_{i-1} + SW_i \tag{28b}$$

The second IIR (Infinite Impulse Response) filter performs the following processing.

$$\Sigma 2 CW_i = \gamma \Sigma CW_{i-1} + CW_i \tag{29a}$$

$$\Sigma 2 SW_i = \gamma \Sigma SW_{i-1} + SW_i \tag{29b}$$

The timing phase difference calculating means 44a simultaneously performs the preamble detection and the timing phase estimation using the preamble by the following processing, and does the timing phase estimation during receiving the significant random data as well.

The first processing is to calculate a normalized vector length $V1_i$ indicated by the output ($\Sigma 1CW_i$, $\Sigma 1SW_i$) from the weighted signal averaging means 50, $$V1_i = \beta(\Sigma 1 CW_i^2 + \Sigma 1 SW_i^2)^{1/2} \tag{30a}$$

and a normalized vector length $V2_i$ indicated by the output ($\Sigma 2CW_i$, $\Sigma 2SW_i$) from the weighted signal averaging means 50, $$V2_i = \gamma(\Sigma 2 CW_i^2 + \Sigma 2 SW_i^2)^{1/2} \tag{30b}$$

The second processing is to latch a timing phase difference $\theta r_{1i}$ obtainable by the following equation when $V1_i$ takes a large value (for example, when $V1_i$ becomes larger than a certain threshold value $\epsilon p1$).

$\theta r_{1i}$ is the vector angle indicated by ($\Sigma 1CW_i$, $\Sigma 1SW_i$).

$$\theta r_{1i} = 2\theta r_{1i} \bmod 360 \tag{31}$$

The third processing is to calculate a timing error $\tau 1$ by Equations (32a) and (32b) using the $\theta r_{1i}$-latched timing phase difference $\theta 1s = \theta r_{1i}$ and supplies the VCO 45 of the following stage with a first control signal for canceling the timing error $\tau 1$.

When $\theta 1s > 180$ [deg]:

$$\tau 1 = (\theta 1s - 360) T/360 \tag{32a}$$

When $\theta 1s \leq 180$ [deg]:

$$\tau 1 = (\theta 1s) T/360 \tag{32b}$$

In the fourth processing, after the phase control by the first control signal (hereinafter referred to as first phase control) the clock phase difference becomes 0 [deg], and the timing phase difference information that is input to the weighted signal averaging means 50 differs before and after the first phase control; hence, after the first phase control the weighted signal averaging means 50 is controlled so that the vector angles indicated by the vectors ($\Sigma 1CW_i$, $\Sigma 1SW_i$) and ($\Sigma 2CW_i$, $\Sigma 2SW_i$) are set in the direction of 0 [deg].

$$\Sigma 1CW_i=(\Sigma 1CW_{i-1}{}^2+\Sigma 1SW_{i-1}{}^2)^{1/2} \tag{33a}$$

$$\Sigma 1SW_i=0 \tag{33b}$$

$$\Sigma 2CW_i=(\Sigma 2CW_{i-1}{}^2+\Sigma 2SW_{i-1}{}^2)^{1/2} \tag{34a}$$

$$\Sigma 2SW_i=0 \tag{34b}$$

The fifth processing is to calculate a timing phase difference $\theta r_{2i}$ by the following equation.
$\theta r_{2i}$ is the vector angle indicated by ($\Sigma 2CW_i$, $\Sigma 2SW_i$).

$$\theta r_{2i}=2\theta_{2i} \bmod 360 \tag{35}$$

In the sixth processing, when the following two conditions (Condition A and Condition B) are satisfied after the first phase control, $\theta r_{2i}$ is latched as timing phase difference information that is derived from a significant data portion received signal, then the latched timing phase difference $\theta 2s=\theta r_{2i}$ is used to calculate a timing error $\tau 2$ by Equations (36a) and (36b), and a second control signal for canceling the timing error $\tau 2$ is provided to the VC 45.

In this instance, Condition A is "the timing phase difference between $\theta r_{1i}$ and $\theta r_{2i}$ (for example, $|\theta r_{1i}-\theta r_{2i}|\leq 45$ [deg])."

And Condition B is "$V2_i$ is large (for example, $V2_i$ is larger than a threshold value $\epsilon p2$)."

In the case of $\theta 2s>180$ [deg]:

$$\tau 2=(\theta 2s-360)T/360 \tag{36a}$$

In the case of $\theta 2s \leq 180$ [deg]:

$$\tau 2=(\theta 2s)T/360 \tag{36b}$$

In the seventh processing, after the phase control by the second control signal (hereinafter referred to as second phase control), too, there is a possibility that the timing phase difference information, which is input to the weighted signal averaging means 50, differs before and after the second phase control; hence, after the second phase control the weighted signal averaging means 50 is controlled by Equations (33a), (33b), (34a) and (34b) so that the vector angles indicated by the vectors ($\Sigma 1CW_i$, $\Sigma 1SW_i$) and ($\Sigma 2CW_i$, $\Sigma 2SW_i$) are set in the direction of 0 [deg].

In the eighth processing, in the case of effecting third and subsequent phase control during continuous reception of the significant random data, a check is made to see if the above-said Condition B holds with a tens-of-symbols period after the second phase control, and if the condition holds, the vector angle $\theta r_{2i}$ indicated by ($\Sigma 2CW_i$, $\Sigma 2SW_i$) at that time is latched, then the latched timing phase difference $\theta 2s=\theta r_{2i}$ is used to calculate the timing error $\tau 2$ by Equations (36a) and (36b), and the second control signal for canceling the timing error $\tau 2$ is applied to the VCO 45. At the same time, control by Equations (33a), (33b), (34a) and (34b) is performed on the weighted signal averaging means 50 to set the vector angles indicated by the vectors by ($\Sigma 1CW_i$, $\Sigma 1SW_i$) and ($\Sigma 2CW_i$, $\Sigma 2SW_i$) to 0 [deg].

In the ninth processing, if $V1_i$ takes a large value again (for example, if $V1_i$ becomes larger than the certain threshold value $\epsilon p1$) in this while, it is decided that the next burst signal has been received, return to the second processing.

FIG. 15 shows an example of the operation of the timing phase difference calculating means. Since the number of pieces of data used for averaging by the weighted signal averaging means 50 is small, $V1_i$ is large in value only during receiving the preamble signal butsmall during receiving the random data portion since the number of pieces of data used for averaging by the weighted signal averaging means 50 is small. On the other hand, $V2_i$ often takes a small value during receiving the preamble signal since the umber of pieces of data used for averaging by the weighted signal averaging means 50 is large and information on the preceding burst signal may sometimes remain, but during receiving the random data portion it issufficiently large in value.

Accordingly, as depicted in FIG. 15, the first phase control is performed by the first to fourth processing during receiving the preamble, and the second and subsequent phase control is performed during receiving the data portion.

Finally, the VCO 45 responds to the control signal from the timing phase difference calculating means 44a to control the phases of the recovered sample clock and the recovered symbol clock, reducing the timing error $\tau$ down to "0".

Thus, Embodiment 4 implements, as is the case with Embodiment 1, high precision timing phase estimation in a short time during receiving these preamble signals, while at the same time it achieves timing synchronization even during receiving the random pattern signal by a scheme different from that of Embodiment 2.

Incidentally, in the case where the timing forreceiving the burst signal is known and the time of arrival of the preamble can be specified, the above-described processing can be substantially reduced. This involves the modifications described below.

First, the weighted signal averaging means 50 is formed by the first lo-pass filter 50a alone, and the time constant (for example, the forgetting coefficient $\beta$ in Equations (28a) and (28b)) of the first low-pass filter 50a is switched between a small value during receiving the preamble signal and a large value during receiving the significant random data.

Second, since the preamble detecting operation is unnecessary, the timing error $\tau$ is calculated from the vector angle indicated by the output ($\Sigma 1CW_i$, $\Sigma 1SW_i$) from the first low-pass filter 50a, using the timing phase difference calculating means 403a of the prior art example instead of using the timing phase difference calculating means 44a.

The above-mentioned two modifications permit substantial reduction of the circuit scale.

Thus, the timing recovery device 40c in Embodiment 4 produces the following effect in addition to those obtainable with Embodiment 1.

That is, the timing recovery device of this embodiment performs high precision timing phase estimation and control with a short preamble signal, while at the same time enables the timing phase to be followed even during receiving the significant random data portion.

Incidentally, as is the case with Embodiment 1, the timing recovery device 45e of Embodiment 4 is applicable to systems using any modulation schemes (BPSK, QPSK, π/4QPSK, OQPSK, FSK, and so on) as long as they are radio communication systems using the preamble signal that effects an alternate transition between two points in the complex plane for each symbol as well as the following two preamble signals ((1) the preamble signal that effects an alternate transition between two origin-symmetric Nyquist points in the complex plane for each symbol, and (2) the preamble signal that effects an alternate transition between two adjacent Nyquist points in the complex plane for each symbol).

Embodiment 5

Figure 16:
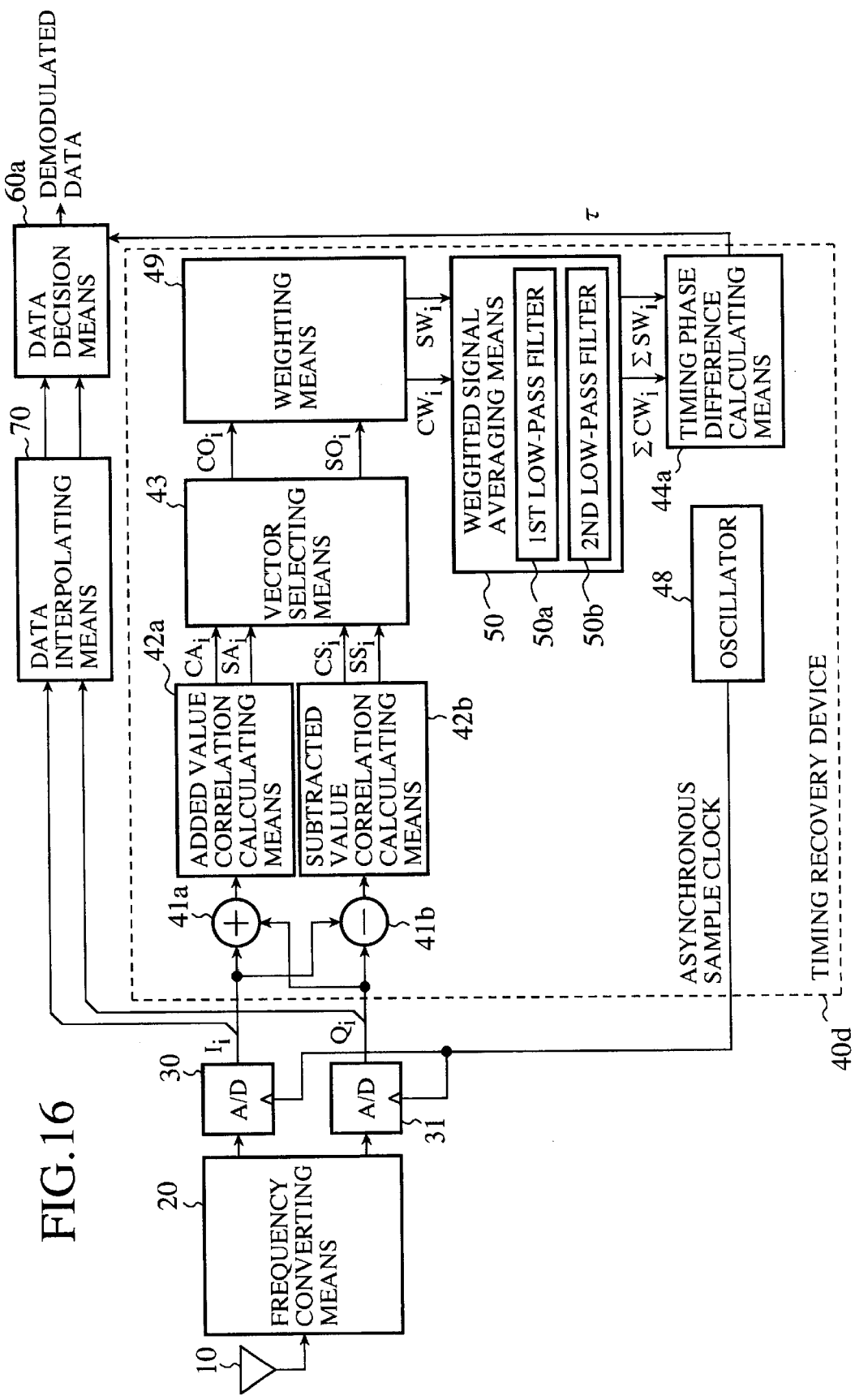
FIG. 16 is a block diagram illustrating the configuration of a demodulator according to Embodiment 5.
Figure 17:
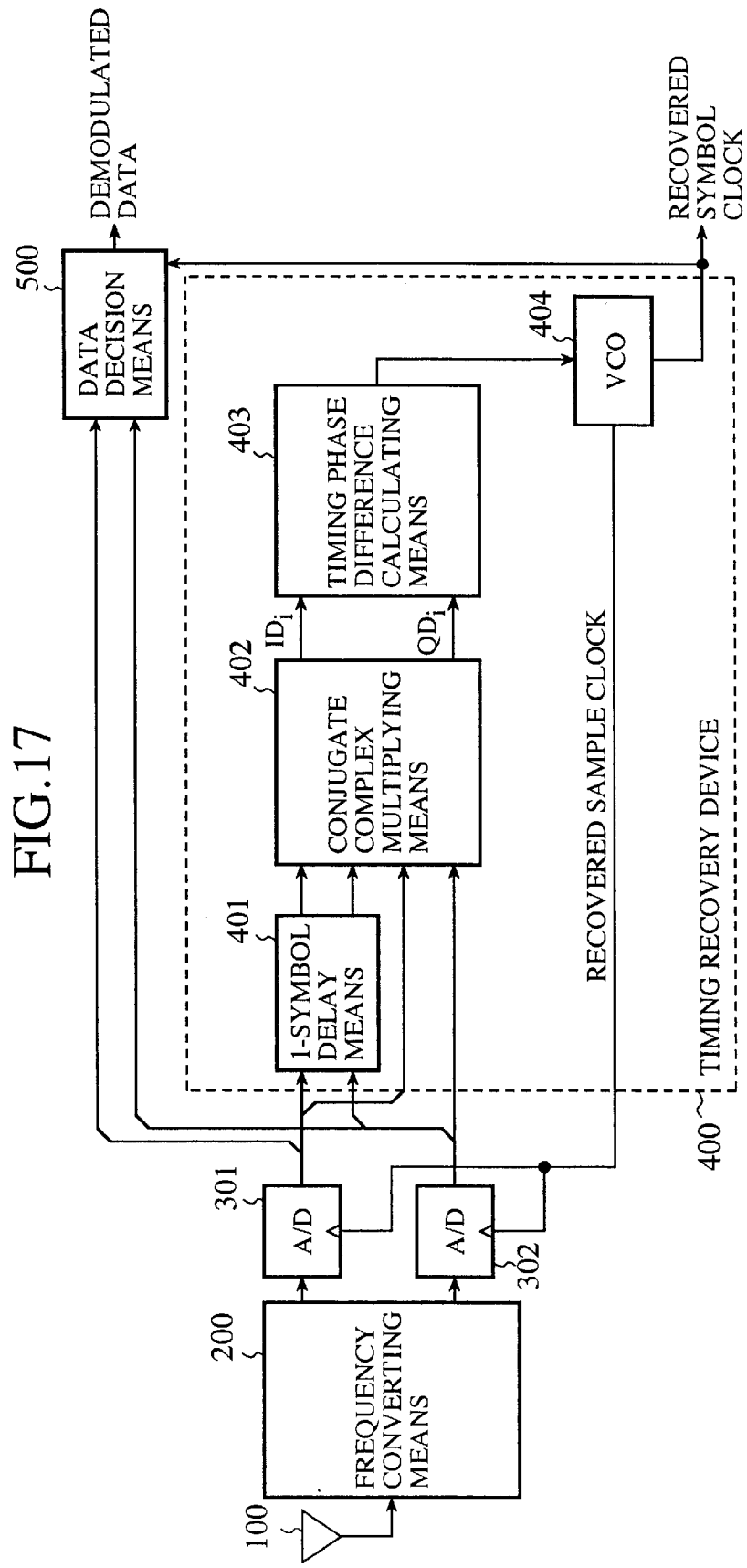
FIG. 17 is a block diagram depicting the configuration of a conventional demodulator.

FIG. 16 is a block diagram illustrating the configuration of a demodulator according to Embodiment 5. In FIG. 16, reference numeral 10 denotes an antenna for receiving a radio signal; 20 denotes frequency converting means for frequency converting the radio signal received by the antenna 10 to a base band signal; 30 and 31 denote A/D converters each for sampling the base band signal frequency converted by the frequency converting means 20 at a rate twice higher than a symbol rate for conversion to a digital base band signal; 40d denotes a timing recovery device for performing timing synchronization, using the digital base band signals converted by the A/D converting means 30 and 31; 70 denotes data interpolating means for interpolating the digital base band signals sampled by an asynchronous sample clock output from the timing recovery device 40b; and 60a denotes data decision means which extracts Nyquist point data from the interpolated digital base band signals output from the data interpolating means 70 and makes a decision on the extracted Nyquist point data.

In the timing recovery device 40d, reference numeral 41a denotes adding means for adding together an in-phase component of the base band signal and a quadrature component of the base band signal; 41b denotes subtracting means for subtracting the in-phase component of the base band signal and the quadrature component of the base band signal from each other; 42a denotes added value correlation calculating means for calculating the correlation between the added signal and a ½ symbol frequency component; 42b denotes subtracted value correlation calculating means for calculating the correlation between the subtracted signal and the ½ symbol frequency component; and 43 denotes vector selecting means which compares the magnitude of the added value correlation signal and the magnitude of the subtracted value correlation signal and selects the correlation signal of the larger magnitude.

Further, reference numeral 44a denotes timing phase difference calculating means for calculating a timing phase difference, using the vector angle indicated by averaged correlation signals; 48 denotes an oscillator (asynchronous sample clock oscillating means) which outputs an asynchronous sample clock and an asynchronous ½ symbol frequency component; 49 denotes weighting means for weighting the selected correlation signals according to the vector length indicated by the selected correlation signals; 50 denotes weighted signal averaging means for averaging the weighted correlation signals; 50a denotes a first low-pass filter of a small time constant which is supplied with the weighted correlation signals; and 50b denotes a second low-pass filter of a large time constant which is supplied with the weighted correlation signals.

The operation of Embodiment 5 will be described below.

While Embodiment 4 has been described to use the feedback type timing recovery device 40c which reduces the timing error τ down to "0" through phase control of the recovered sample clock and the recovered symbol clock by the VCO 45, the timing recovery device can be modified to such a feedforward type timing recovery device as indicated by the timing recovery device 40d in Embodiment 5. That is, the VCO 45 is replaced with the oscillator 48, then the data interpolating means 70 is added, and the processing of the data decision means 60 is switched to processing of the data decision means 60a.

The oscillator 48 outputs a free-running asynchronous sample clock of a period twice longer than the symbol period. The A/D converters 30 and 31 sample data by the asynchronous sample clock at a rate of 2 [sample/symbol].

The adding means 41a and the subtracting means 41b perform the addition and subtraction of the asynchronously sampled received data ($I_i$, $Q_i$) as in Embodiment 1. The added value correlation calculating means 42a calculates the correlation between the added signal output from the adding means 41a and the ½ symbol frequency component $\exp[-j\pi(fs)t]$ output from the oscillator in the same manner as in Embodiment 2.

The subtracted value correlation calculating means 42b calculates the correlation between the subtracted signal output from the subtracting means 41b and the ½ symbol frequency component $\exp[-j\pi(fs)t]$ output from the oscillator in the same manner as in Embodiment 2. The vector selecting means 43 and the weighting means 50 perform the same processing as in Embodiment 4 to calculate the timing errors.

The timing phase difference calculating means 44b performs the same operation as does the timing phase difference calculating means 44a except the point mentioned below. The following is a difference between the timing phase difference calculating means 44b and the timing phase difference calculating means 44a.

That is, since the timing phase difference calculating means 44b is the feedforward type, the phase of the sample clock is not controlled. In contrast to this, since the timing phase difference calculating means 44a is the feedback type, control by Equations (33a), (33b), (34a) and (34b) is performed on the weighted signal averaging means 50, avoiding the necessity for setting the vector angles indicated by ($\Sigma 1CW_i$, $\Sigma 1SW_i$) and ($\Sigma 2CW_i$, $\Sigma 2SW_i$) to 0 [deg].

The data interpolating means 70 interpolates the received data ($I_i$, $Q_i$) obtained by asynchronous sampling at the rate of 2 [sample/symbol] to generate received data having time resolution 1/16 the symbol period, for instance, and outputs interpolated received data.

The data decision means 60a uses the timing error τ information from the timing phase difference calculating means 44a to extract Nyquist point data of the interpolated received data, and outputs the extracted Nyquist point data as demodulated data.

The feedforward type configuration of the timing recovery device of Embodiment 5 described above produces the following effect in addition to those obtainable with Embodiment 4.

That is, the use of the low-cost and small-sized oscillator 48 permits further reduction of the cost and downsizing of the timing recovery device 40d.

Incidentally, as is the case with Embodiment 1 the timing recovery device 45d of Embodiment 5 is applicable to systems using any modulation schemes (BPSK, QPSK, π/4QPSK, OQPSK, FSK, and so on) as long as they are radio communication systems using the preamble signal that effects an alternate transition between two points in the complex plane for each symbol as well as the following two preamble signals ((1) the preamble signal that effects an alternate transition between two origin-symmetric Nyquist points in the complex plane for each symbol, and (2) the preamble signal that effects an alternate transition between two adjacent Nyquist points in the complex plane for each symbol).

INDUSTRIAL APPLICABILITY

The timing recovery device and the demodulator according to the present invention are suitable for use in broadband radio communication systems using a burst signal that begins with a preamble.

What is claimed is:

1. A timing recovery device characterized by the provision of:
   adding means for adding together an in-phase component of a base band signal and a quadrature component of the base band signal and for outputting a signal after the addition as an added signal;
   subtracting means for subtracting the in-phase component of the base band signal and the quadrature component of the base band signal from each other and for outputting a signal after the subtraction as a subtracted signal;
   added value correlation calculating means for calculating the correlation between said added signal and a ½ symbol frequency component generated at the receiver side, and for outputting the calculated correlation value as an added correlation signal;
   subtracted value correlation calculating means for calculating the correlation between said subtracted signal and said ½ symbol frequency component, and for outputting the calculated correlation value as a subtracted correlation signal;
   vector selecting means for comparing the magnitude of said added correlation signal and the magnitude of said subtracted correlation signal, for selecting the correlation signal of the larger magnitude, and for outputting the selected correlation signal as a selected correlation signal; and
   timing phase difference calculating means for calculating a timing phase difference through utilization of the vector angle indicated by said selected correlation signal.

2. The timing recovery device as claimed in claim 1, characterized in that said timing phase difference calculating means calculates the vector angle and the vector length indicated by said selected correlation signal, and when said vector length is large, decides that said preamble signal is detected, and calculates the timing phase difference through utilization of the vector angle indicated by said selected correlation signal at that time.

3. The timing recovery device as claimed in claim 1, characterized by further provision of recovered sample clock oscillating means for outputting a recovered sample clock for sampling said base band signal and a recovered ½ symbol frequency component, and for effecting phase control to reduce a timing error down to "0" through utilization of said timing phase difference information.

4. The timing recovery device as claimed in claim 3, characterized in that: said added value correlation calculating means, said subtracted value correlation calculating means, said vector selecting means, said timing phase difference calculating means and said recovered sample clock oscillating means use, for their processing, a base band signal sampled by said recovered sample clock; and
   said added value correlation calculating means and said subtracted value correlation calculating means render said ½ symbol frequency component to said recovered ½ symbol frequency component.

5. A demodulator is characterized by the provision of:
   the timing recovery device as claimed in claim 4;
   an antenna for receiving a radio signal;
   frequency converting means for frequency converting said radio signal received by said antenna to a base band signal;
   A/D converting means for sampling said base band signal converted by said frequency converting means at a rate twice higher than a symbol rate through the use of said recovered sample clock for conversion to a digital base band signal for application to said timing recovery device; and
   data decision means for extracting Nyquist point data from said digital base band signal through the use of a recovered symbol clock output from said timing recovery device, for making a decision on said extracted Nyquist point data and for outputting said decided Nyquist point data as demodulated data.

6. The timing recovery device as claimed in claim 3, characterized by further provision of:
   phase detecting means for detecting the timing phase through the use of said base band signal sampled by said recovered sample clock and for outputting the detected signal as a phase detected signal; and
   phase detected signal averaging means for averaging said phase detected signal and for outputting the average as a phase lead/lag signal;
   wherein said recovered sample clock oscillating means uses both of said timing phase difference information and said phase lead/lag signal to effect phase control to reduce the timing error down to "0".

7. A demodulator is characterized by the provision of:
   the timing recovery device as claimed in claim 6;
   an antenna for receiving a radio signal;
   frequency converting means for frequency converting said radio signal received by said antenna to a base band signal;
   A/D converting means for sampling said base band signal converted by said frequency converting means at a rate twice higher than a symbol rate through the use of said recovered sample clock for conversion to a digital base band signal for application to said timing recovery device; and
   data decision means for extracting Nyquist point data from said digital base band signal through the use of a recovered symbol clock output from said timing recovery device, for making a decision on said extracted Nyquist point data and for outputting said decided Nyquist point data as demodulated data.

8. A demodulator is characterized by the provision of:
   the timing recovery device as claimed in claim 3;
   an antenna for receiving a radio signal;
   frequency converting means for frequency converting said radio signal received by said antenna to a base band signal;
   A/D converting means for sampling said base band signal converted by said frequency converting means at a rate twice higher than a symbol rate through the use of said recovered sample clock for conversion to a digital base band signal for application to said timing recovery device; and
   data decision means for extracting Nyquist point data from said digital base band signal through the use of a recovered symbol clock output from said timing recovery device, for making a decision on said extracted Nyquist point data and for outputting said decided Nyquist point data as demodulated data.

9. The timing recovery device as claimed in claim 1, characterized by further provision of asynchronous sample clock oscillating means for outputting an asynchronous sample clock for sampling said base band signal and an asynchronous ½ symbol frequency component.

10. The timing recovery device as claimed in claim 9, characterized in that: said added value correlation calculating means, said subtracted value correlation calculating means, said vector selecting means, said timing phase difference calculating means and said asynchronous sample clock oscillating means use, for their processing, the base band signal sampled by said asynchronous sample clock; and the added value correlation calculating means; and said added value correlation calculating means and said subtracted value correlation calculating means render said ½ symbol frequency component to said asynchronous ½ symbol frequency component.

11. A demodulator characterized by the provision of:

the timing recovery device as claimed in claim 10;

an antenna for receiving a radio signal;

frequency converting means for frequency converting said radio signal received by said antenna to a base band signal;

A/D converting means for sampling the base band signal converted by said frequency converting means at a rate twice higher than a symbol rate through the use of said asynchronous sample clock for conversion to a digital base band signal for application to said timing recovery device;

data interpolating means for interpolating said digital base band signal sampled by the asynchronous sample clock output from said timing recovery device, and for outputting the interpolated data as an interpolated base band signal; and data decision means for extracting a Nyquist point of the interpolated digital base band signal output from said data interpolating means based on said timing phase difference, for making a decision on said extracted Nyquist point data and for outputting the decided Nyquist point data as demodulated data.

12. A demodulator characterized by the provision of:

the timing recovery device as claimed in claim 9;

an antenna for receiving a radio signal;

frequency converting means for frequency converting said radio signal received by said antenna to a base band signal;

A/D converting means for sampling the base band signal converted by said frequency converting means at a rate twice higher than a symbol rate through the use of said asynchronous sample clock for conversion to a digital base band signal for application to said timing recovery device;

data interpolating means for interpolating said digital base band signal sampled by the asynchronous sample clock output from said timing recovery device, and for outputting the interpolated data as an interpolated base band signal; and data decision means for extracting a Nyquist point of the interpolated digital base band signal output from said data interpolating means based on said timing phase difference, for making a decision on said extracted Nyquist point data and for outputting the decided Nyquist point data as demodulated data.

13. A timing recovery device characterized by the provision of:

adding means for adding together an in-phase component of a base band signal and a quadrature component of the base band signal and for outputting a signal after the addition as an added signal;

subtracting means for subtracting the in-phase component of the base band signal and the quadrature component of the base band signal from each other and for outputting a signal after the subtraction as a subtracted signal;

added value correlation calculating means for calculating the correlation between said added signal and a ½ symbol frequency component generated at the receiver side, and for outputting the calculated correlation value as an added correlation signal;

subtracted value correlation calculating means for calculating the correlation between said subtracted signal and said ½ symbol frequency component, and for outputting the calculated correlation value as a subtracted correlation signal;

vector selecting means for comparing the magnitude of said added correlation signal and the magnitude of said subtracted correlation signal, for selecting the correlation signal of the larger magnitude, and for outputting the selected correlation signal as a selected correlation signal;

weighting means for weighting said selected correlation signal in accordance with the magnitude of the vector length indicated by said selected correlation signal, and for outputting said weighted selected correlation signal as a weighted correlation signal;

weighted signal averaging means for averaging said weighted correlation signal and for outputting the average as a weighted average correlation signal; and timing phase difference calculating means for calculating a timing phase difference through utilization of the vector angle indicated by said averaged correlation signal.

14. The timing recovery device as claimed in claim 13, characterized in that said timing phase difference calculating means calculates the vector angle and vector length indicated by said weighted average correlation signal, and when said vector length is large, detects that said preamble signal is detected, and calculates the timing difference through utilization of the vector angle indicated by said selected correlation signal at that time.

15. The timing recovery device as claimed in claim 13, characterized by further provision of recovered sample clock oscillating means for outputting a recovered sample clock for sampling said base band signal and a recovered ½ symbol frequency component, and for effecting phase control to reduce a timing error down to "0" through utilization of said timing phase difference information.

16. The timing recovery device as claimed in claim 15, characterized in that: said added value correlation calculating means, said subtracted value correlation calculating means, said vector selecting means, said weighting means, said weighted signal averaging means, said timing phase difference calculating means and said recovered sample clock oscillating means use, for their processing, a base band signal sampled by said recovered sample clock; and said added value correlation calculating means and said subtracted value correlation calculating means render said, ½ symbol frequency component to said recovered ½ symbol frequency component.

17. A demodulator is characterized by the provision of:

the timing recovery device as claimed in claim 16;

an antenna for receiving a radio signal;

frequency converting means for frequency converting said radio signal received by said antenna to a base band signal;

A/D converting means for sampling said base band signal converted by said frequency converting means at a rate twice higher than a symbol rate through the use of said recovered sample clock for conversion to a digital base band signal for application to said timing recovery device; and data decision means for extracting Nyquist point data from said digital base band signal through the use of a recovered symbol clock output from said timing recovery device, for making a decision on said extracted Nyquist point data and for outputting said decided Nyquist point data as demodulated data.

18. The timing recovery device as claimed in claim 15, characterized in that: said weighted signal averaging means comprises a first low-pass filter of a small time constant and a second low-pass filter of a large time constant which are supplied with said weighted correlation signal and at the time of phase control, sets "0" in a quadrature component and (in-phase component$^2$+quadrature component$^2$)$^{1/2}$ prior to the phase control in an in-phase component in each of said first and second low-pass filters;

said timing phase difference calculating means calculates a first vector angle and a first vector length indicated by said first low-pass filter, and when said vector length is large, decides that said preamble signal is detected, calculates an initial timing phase difference through the use of said first vector angle, calculates a second vector angle and a second vector length indicated by said second low-pass filter, and when said second vector length is large after said first phase control, periodically calculates a timing phase difference for phase following use through the use of said second vector angle; and said recovered sample clock oscillating means uses both of said initial timing phase difference and said phase-following timing phase difference as said timing phase difference information to effect phase control to reduce the timing error down to "0".

19. A demodulator is characterized by the provision of:

the timing recovery device as claimed in claim 18;

an antenna for receiving a radio signal;

frequency converting means for frequency converting said radio signal received by said antenna to a base band signal;

A/D converting means for sampling said base band signal converted by said frequency converting means at a rate twice higher than a symbol rate through the use of said recovered sample clock for conversion to a digital base band signal for application to said timing recovery device; and data decision means for extracting Nyquist point data from said digital base band signal through the use of a recovered symbol clock output from said timing recovery device, for making a decision on said extracted Nyquist point data and for outputting said decided Nyquist point data as demodulated data.

20. A demodulator is characterized by the provision of:

the timing recovery device as claimed in claim 15;

an antenna for receiving a radio signal;

frequency converting means for frequency converting said radio signal received by said antenna to a base band signal;

A/D converting means for sampling said base band signal converted by said frequency converting means at a rate twice higher than a symbol rate through the use of said recovered sample clock for conversion to a digital base band signal for application to said timing recovery device; and data decision means for extracting Nyquist point data from said digital base band signal through the use of a recovered symbol clock output from said timing recovery device, for making a decision on said extracted Nyquist point data and for outputting said decided Nyquist point data as demodulated data.

21. The timing recovery device as claimed in claim 13, characterized by further provision of asynchronous sample clock oscillating means for outputting an asynchronous sample clock for sampling said base band signal and an asynchronous ½ symbol frequency component.

22. The timing recovery device as claimed in claim 21, characterized in that: said added value correlation calculating means, said subtracted value correlation calculating means, said vector selecting means, said weighting means, said weighted signal averaging means, said timing phase difference calculating means and said asynchronous sample clock oscillating means use, for their processing, a base band signal sampled by said asynchronous sample clock; and said added value correlation calculating means and said subtracted value correlation calculating means render said ½ symbol frequency component to said asynchronous ½ symbol frequency component.

23. The timing recovery device as claimed in claim 21, characterized in that: said weighted signal averaging means further comprises a first low-pass filter of a small time constant and a second low-pass filter of a large time constant which are supplied with said weighted correlation signal; and said timing phase difference calculating means calculates a first vector angle and a first vector length indicated by said first low-pass filter, and when said first vector length is large, decides that said preamble signal is detected, calculates an initial timing phase difference through the use of said first vector angle, calculates a second vector angle and a second vector length indicated by said second low-pass filter, and when said second vector length is large after said first phase control, periodically calculates a timing phase difference for phase following use through the use of said second vector angle.

24. A demodulator characterized by the provision of:

the timing recovery device as claimed in claim 15;

an antenna for receiving a radio signal;

frequency converting means for frequency converting the radio signal received by said antenna to a base band signal;

A/D converting means for sampling the base band signal converted by said frequency converting means at a rate twice higher than a symbol rate through the use of an asynchronous sample clock for conversion to a digital base band signal for application to said timing recovery device;

data interpolating means for interpolating said digital base band signal sampled by the asynchronous sample clock output from the timing recovery device, and for outputting the interpolated data as an interpolated base band signal; and data decision means for extracting a Nyquist point of the interpolated digital base band signal output from said data interpolating means based on both of said initial timing phase difference and said timing phase difference for phase following use, for making a decision on said extracted Nyquist point data and for outputting the decided Nyquist point data as demodulated data.

* * * * *